US012750435B2

(12) United States Patent
Hwang et al.

(10) Patent No.: US 12,750,435 B2
(45) Date of Patent: Sep. 29, 2026

(54) FOLDABLE ELECTRONIC DEVICE INCLUDING ANTENNA

(71) Applicant: Samsung Electronics Co., Ltd., Suwon-si (KR)

(72) Inventors: Soonho Hwang, Suwon-si (KR); Himchan Yun, Suwon-si (KR); Kookjoo Lee, Suwon-si (KR); Hojung Nam, Suwon-si (KR); Sungkoo Park, Suwon-si (KR); Kyungjae Lee, Suwon-si (KR); Donguk Choi, Suwon-si (KR); Seunghwan Kim, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 18/483,995

(22) Filed: Oct. 10, 2023

(65) Prior Publication Data

US 2024/0040020 A1 Feb. 1, 2024

Related U.S. Application Data

(63) Continuation of application No. PCT/KR2023/010308, filed on Jul. 18, 2023.

(30) Foreign Application Priority Data

Jul. 26, 2022 (KR) ........................ 10-2022-0092782
Sep. 16, 2022 (KR) ........................ 10-2022-0116818

(51) Int. Cl.

| | |
|---|---|
| ***H04M 1/00*** | (2006.01) |
| ***H01Q 1/24*** | (2006.01) |
| ***H04M 1/02*** | (2006.01) |

(52) U.S. Cl.
CPC .......... *H04M 1/0214* (2013.01); *H01Q 1/243* (2013.01); *H04M 1/0268* (2013.01)

(58) Field of Classification Search
CPC .... H04M 1/0214; H04M 1/0268; H04M 1/02; H04M 1/026; H04M 1/0277;
(Continued)

(56) References Cited

U.S. PATENT DOCUMENTS

2018/0288203 A1 10/2018 Jeon et al.
2020/0076062 A1 3/2020 Lee et al.
(Continued)

FOREIGN PATENT DOCUMENTS

CN 111613873 A 9/2020
CN 114530691 A 5/2022
(Continued)

OTHER PUBLICATIONS

Extended European Search Report dated Jun. 26, 2025; European Appln. No. 23846893.8-1201 / 4521724 PCT/KR2023010308.
(Continued)

*Primary Examiner* — Ping Y Hsieh
(74) *Attorney, Agent, or Firm* — Jefferson IP Law, LLP

(57) ABSTRACT

A foldable electronic device is provided that includes a hinge module, a first housing coupled to a first side of the hinge module, a first printed circuit board disposed inside the first housing and including a first wireless communication module, a processor, and a first ground or a second ground, and a second housing coupled to a second side of the hinge module, in which the first housing includes a first segmenting portion, a second segmenting portion, a first conductive portion, and a second conductive portion, in which the second housing includes a second wireless communication module, a third segmenting portion, a fourth segmenting portion, a third conductive portion, and a fourth
(Continued)

conductive portion, and in which a matching circuit is disposed between the first conductive portion and the first ground, and a first filter circuit is connected to a signal path between the first conductive portion and the matching circuit.

20 Claims, 18 Drawing Sheets

(58) Field of Classification Search
CPC .......... H01Q 1/243; H01Q 1/24; H01Q 1/521; H01Q 5/378; H01Q 5/40; H01Q 5/50; G06F 1/16; H03H 7/01; H03H 7/38
See application file for complete search history.

(56) References Cited

U.S. PATENT DOCUMENTS

| | | | |
|---|---|---|---|
| 2021/0185164 | A1 | 6/2021 | Jung et al. |
| 2021/0318720 | A1 | 10/2021 | Lin et al. |
| 2021/0337054 | A1 | 10/2021 | Choi et al. |
| 2021/0344783 | A1 | 11/2021 | Jeong et al. |
| 2022/0115768 | A1 | 4/2022 | Oh et al. |
| 2022/0123469 | A1 | 4/2022 | Hsu et al. |
| 2023/0205371 | A1 | 6/2023 | Choe |
| 2023/0299466 | A1 | 9/2023 | An et al. |
| 2024/0297437 | A1 | 9/2024 | Park et al. |

FOREIGN PATENT DOCUMENTS

| | | | |
|---|---|---|---|
| EP | 4 235 958 | A1 | 8/2023 |
| EP | 4 418 450 | A1 | 8/2024 |
| KR | 10-2018-0109509 | A | 10/2018 |
| KR | 10-2020-0024500 | A | 3/2020 |
| KR | 10-2020-0027734 | A | 3/2020 |
| KR | 10-2020-0100986 | A | 8/2020 |
| KR | 10-2021-0075834 | A | 6/2021 |
| KR | 10-2022-0031405 | A | 3/2022 |
| KR | 10-2022-0056627 | A | 5/2022 |
| KR | 10-2022-0077434 | A | 6/2022 |
| WO | 2020/259663 | A1 | 12/2020 |
| WO | 2021/215554 | A1 | 10/2021 |

OTHER PUBLICATIONS

International Search Report with Written Opinion and English translation dated Oct. 24, 2023; International Appln. No. PCT/KR2023/010308.

FOLDABLE ELECTRONIC DEVICE INCLUDING ANTENNA

CROSS-REFERENCE TO RELATED APPLICATION(S)

This application is a continuation application, claiming priority under § 365(c), of an International application No. PCT/KR2023/010308, filed on Jul. 18, 2023, which is based on and claims the benefit of a Korean patent application number 10-2022-0092782, filed on Jul. 26, 2022, in the Korean Intellectual Property Office, and of a Korean patent application number 10-2022-0116818, filed on Sep. 16, 2022, in the Korean Intellectual Property Office, the disclosure of each of which is incorporated by reference herein in its entirety.

TECHNICAL FIELD

The disclosure relates to a foldable electronic device including at least one antenna.

BACKGROUND ART

An electronic devices such as a bar type, a foldable type, a roller type, or a sliding type of smartphone or tablet personal computer (PC) is increasingly being used, and various functions are being provided in the electronic device.

The electronic device may transmit and receive telephone calls and various data with other electronic devices over wireless communication.

The electronic device may include at least one antenna to perform wireless communication with other electronic devices using a network.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A foldable electronic device may be operated in a folded state or an unfolded state with a first housing and a second housing with respect to a hinge module.

The foldable electronic device may be operated in an in-folding and/or out-folding manner by rotation of the first housing and the second housing using the hinge module.

The foldable electronic device may include at least one of the first housing or the second housing made of a conductive material (e.g., metal). At least a portion of the first housing and/or the second housing made of the conductive material may be utilized as an antenna (e.g., an antenna radiator) to perform a wireless communication. For example, the first housing and/or the second housing of the foldable electronic device may be separated by at least one segmenting portion (e.g., a slit) and used as at least one antenna.

The conductive portion formed on the first housing may overlap the conductive portion (e.g., an antenna) formed on the second housing when the first housing and the second housing are in the folded state. In the foldable electronic device, the conductive portions may be disposed adjacent to each other by means of at least one segmenting portion formed in the first housing. In the foldable electronic device, the conductive portions may be disposed adjacent to each other by means of at least one segmenting portion formed in the second housing.

When the first housing and the second housing are in the folded state, and the conductive portion of the first housing and the conductive portion of the second housing (e.g., an antenna) are overlapped, electric components of the conductive portion of the first housing may degrade radiation performance of the conductive portion of the second housing that performs a function of an antenna. In the foldable electronic device, when a first conductive portion and a second conductive portion (e.g., an antenna) that are separated by the segmenting portion of the first housing are disposed adjacent to each other, an electrical component of the first conductive portion may degrade radiation performance of the second conductive portion that performs a function of an antenna. In the foldable electronic device, when a third conductive portion and a fourth conductive portion that are separated by the segmenting portion of the second housing are disposed adjacent to each other, an electrical component of the fourth conductive portion may degrade radiation performance of the third conductive portion that performs a function of an antenna.

When the radiation performance of the antenna is degraded, the foldable electronic device may not perform telephone calls and/or data transmission and reception normally with other electronic devices.

Aspects of the disclosure are to address at least the above-mentioned problems and/or disadvantages and to provide at least the advantages described below. Accordingly, an aspect of the disclosure is to provide a foldable electronic device capable of preventing degradation of the radiation performance of the antenna, using a matching circuit and at least one filter circuit, even when the conductive portions of the first housing and/or the conductive portions of the second housing are overlapped or disposed adjacent to each other.

Additional aspects will be set forth in part in the description which follows and, in part, will be apparent from the description, or may be learned by practice of the presented embodiments.

Solution to Problem

In accordance with an aspect of the disclosure, a foldable electronic device is provided. The foldable electronic device may include a hinge module, a first housing coupled at least partially to a first side of the hinge module, a first printed circuit board disposed inside the first housing and including a first wireless communication module, a processor, and at least one of a first ground or a second ground, and a second housing coupled at least partially to a second side of the hinge module, and configured to be at least one of unfoldable or foldable with the first housing using the hinge module. According to an embodiment, the first housing may include a first segmenting portion, a second segmenting portion, a first conductive portion disposed between the first segmenting portion and the second segmenting portion, and a second conductive portion disposed between the hinge module and the second segmenting portion, and electrically connected to the first wireless communication module. According to an embodiment, the second housing may include a second wireless communication module, a third segmenting portion, a fourth segmenting portion, a third conductive portion disposed between the third segmenting portion and the fourth segmenting portion, and electrically connected to the second wireless communication module, and a fourth conductive portion disposed between the hinge module and the third segmenting portion, and electrically connected to the second wireless communication module. According to an embodiment, a matching circuit is disposed between the first conductive portion and the first ground, and a first filter circuit may be connected to a signal path between the first conductive portion and the matching circuit.

In accordance with another aspect of the disclosure, a foldable electronic device is provided. The foldable electronic device may include a hinge module, a first housing coupled at least partially to a first side of the hinge module and including a first printed circuit board in which a wireless communication module and a processor disposed, and a second housing coupled at least partially to a second side of the hinge module, and configured to be at least one of unfoldable or foldable with the first housing using the hinge module. According to an embodiment, the first housing may include a first segmenting portion, a second segmenting portion, a third segmenting portion, a first conductive portion disposed between the first segmenting portion and the second segmenting portion, and electrically connected to the wireless communication module, a second conductive portion disposed between the second segmenting portion and the third segmenting portion, and electrically connected to the wireless communication module, and a filter circuit electrically connected to a signal path between the wireless communication module and the second conductive portion.

In accordance with another aspect of the disclosure, a foldable electronic device is provided. The foldable electronic device may include a hinge module, a first housing coupled at least partially to a first side of the hinge module and including a first printed circuit board in which a wireless communication module and a processor disposed, and a second housing coupled at least partially to a second side of the hinge module, and configured to be at least one of unfoldable or foldable with the first housing using the hinge module. According to an embodiment, the first housing may include a first segmenting portion, a second segmenting portion, a third segmenting portion, a first conductive portion disposed between the first segmenting portion and the second segmenting portion, and electrically connected to the wireless communication module, a second conductive portion disposed between the second segmenting portion and the third segmenting portion, and electrically connected to the wireless communication module, a diplexer electrically connected between the wireless communication module and the second conductive portion, and a filter circuit electrically connected to a signal path between the wireless communication module and the second conductive portion.

Advantageous Effects of Invention

According to various embodiments of the disclosure, degradation of radiation performance of the antenna may be prevented, using a matching circuit and at least one filter circuit, even when the conductive portions of the first housing and/or the conductive portions of the second housing are overlapped or disposed adjacent to each other.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
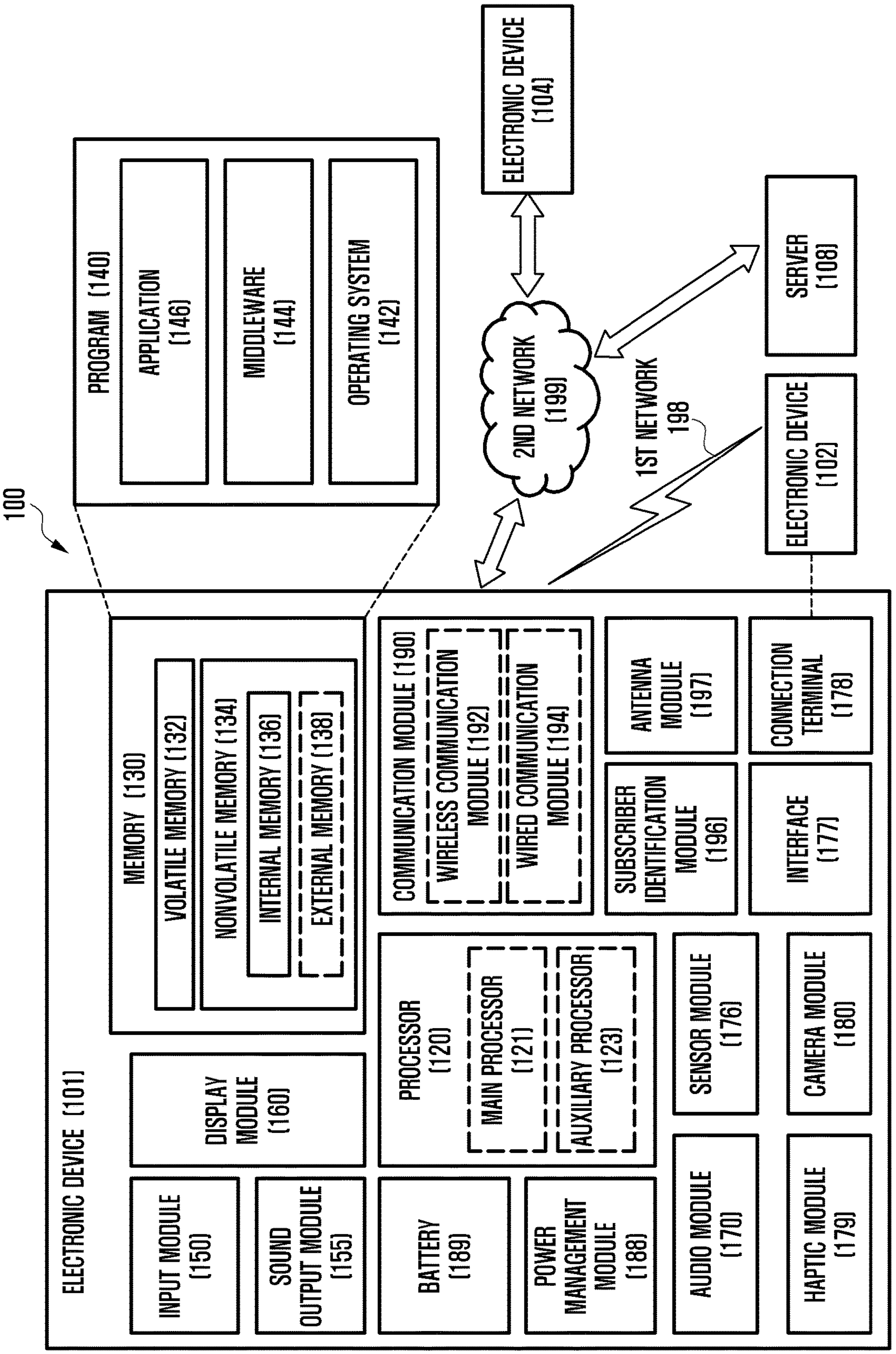
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include at least one of the volatile memory 132 or the non-volatile memory 134. The non-volatile memory 134 may include at least one of internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology. According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
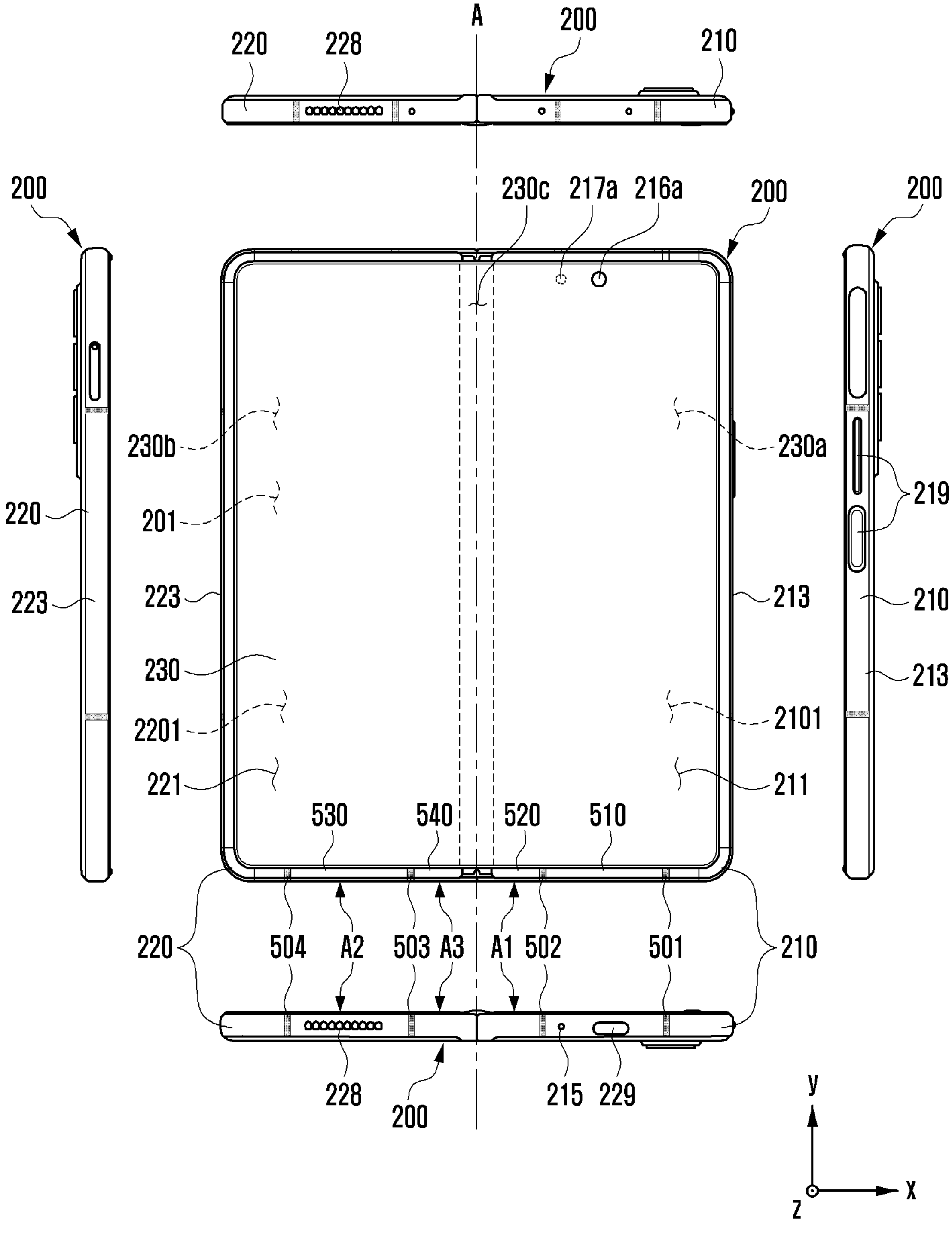
FIGS. 2A and 2B are views illustrating an unfolded state of a foldable electronic device, when viewed from a front surface and a rear surface of the foldable electronic device according to various embodiments of the disclosure.
Figure 2B:
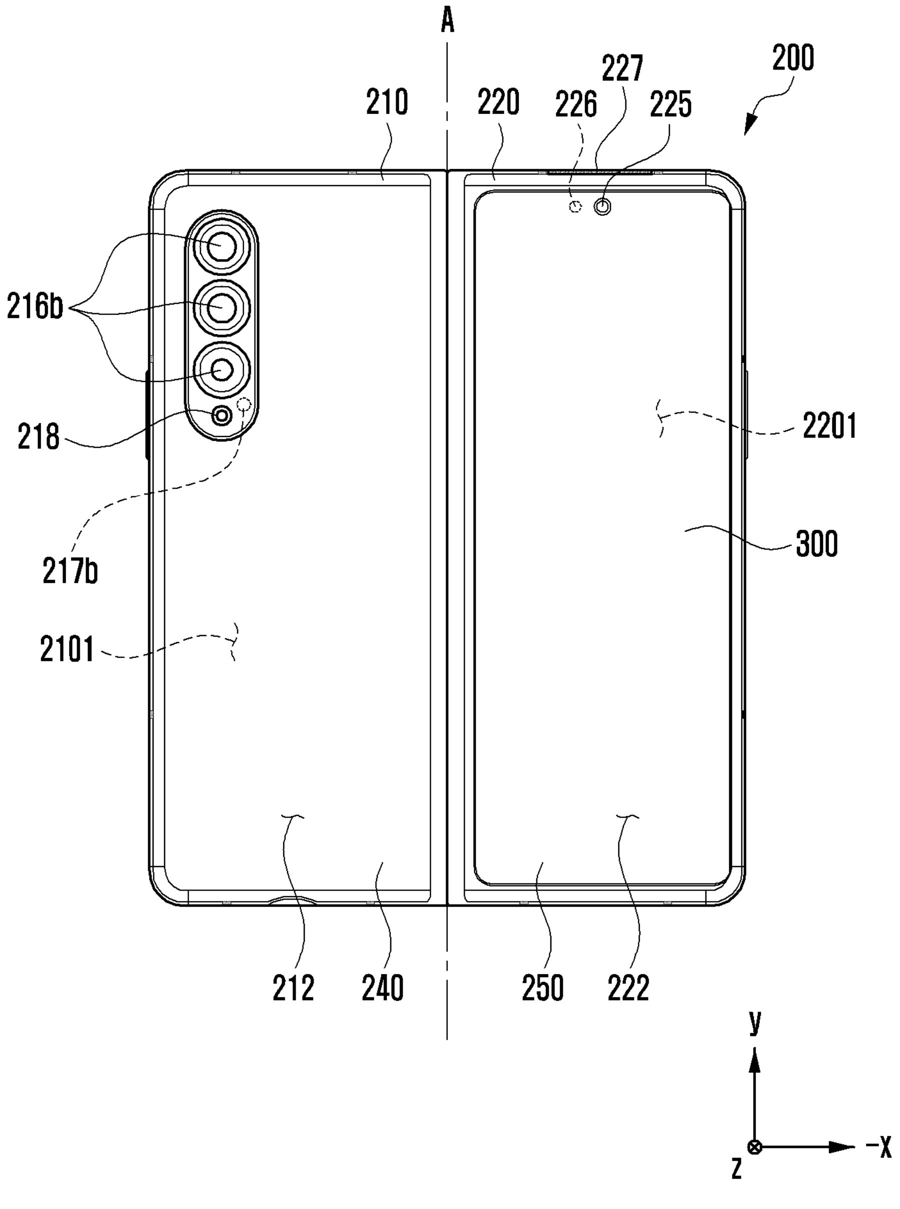
Figure 3A:
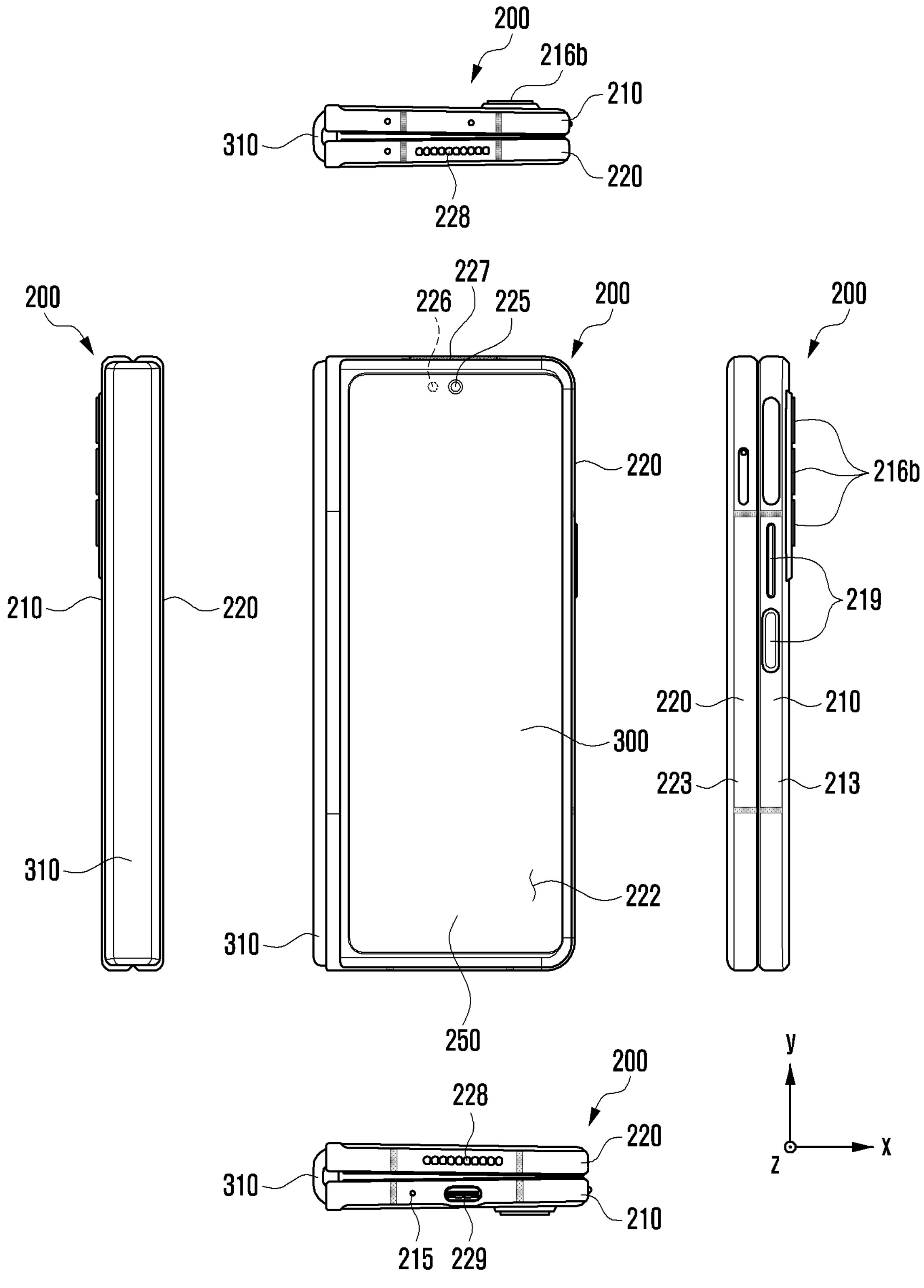
FIGS. 3A and 3B are views illustrating a folded state of the foldable electronic device, when viewed from the front surface and the rear surface of the foldable electronic device according to various embodiments of the disclosure.
Figure 3B:
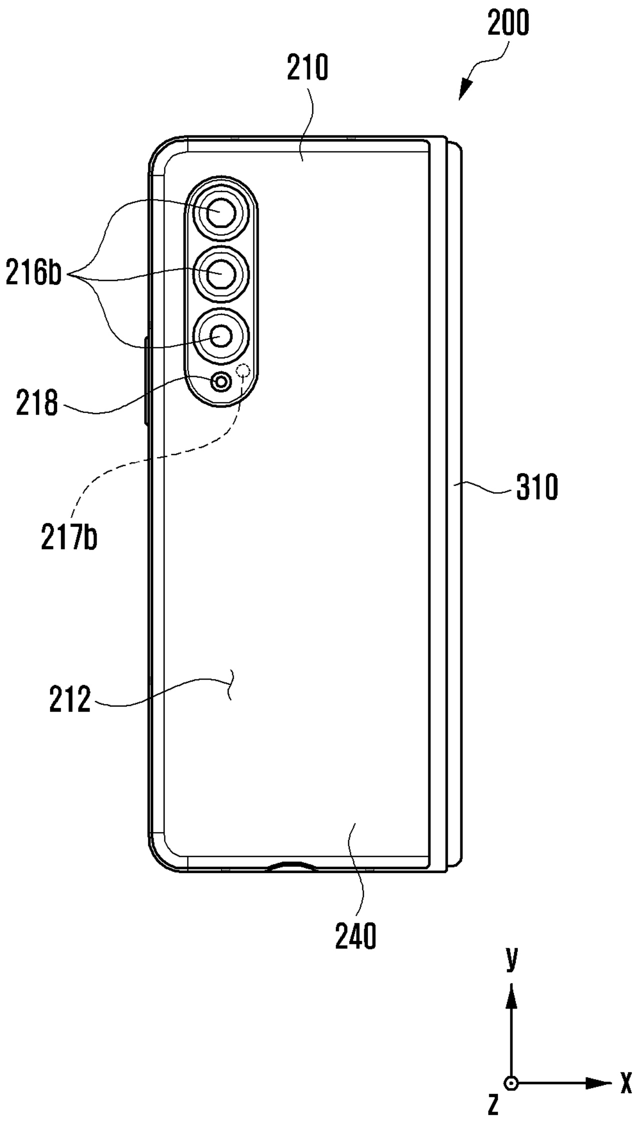

FIGS. 2A and 2B are views illustrating an unfolded state of a foldable electronic device, when viewed from a front surface and a rear surface of the foldable electronic device according to various embodiments of the disclosure. FIGS. 3A and 3B are views illustrating the folded state of an electronic device, when viewed from the front surface and the rear surface of the electronic device according to various embodiments of the disclosure.

According to various embodiments, the embodiments disclosed in FIG. 1 may be included in the embodiments disclosed in FIGS. 2A, 2B, 3A, and 3B. For example, a foldable electronic device 200 disclosed in FIGS. 2A, 2B, 3A, and 3B may include the processor 120, the memory 130, the input module 150, the acoustic output module 155, the display module 160, the audio module 170, the sensor module 176, the interface 177, the connection terminal 178, the haptic module 179, the camera module 180, the antenna module 197, and/or the subscriber identification module 196 that are disclosed in FIG. 1.

Referring to FIGS. 2A, 2B, 3A, and 3B, the foldable electronic device 200 according to various embodiments of the disclosure may include: a pair of housings 210 and 220 (e.g., a foldable housing structure) rotatably coupled with respect to a folding axis A to be foldable to each other by means of a hinge device (e.g., a hinge plate 320 in FIG. 4) (e.g., a hinge module); a flexible display 230 (e.g., a first display, a foldable display, or a main display) disposed by means of the pair of housings 210 and 220; and/or a sub display 300 (e.g., a second display) disposed by means of the second housing 220.

According to various embodiments, at least a portion of the hinge device (e.g., the hinge plate 320 in FIG. 4) may be disposed invisibly from the outside by means of the first housing 210 and the second housing 220 and by means of a hinge cover 310 (e.g., a hinge housing) that covers a foldable portion in the unfolded state. In the document, a surface on which the flexible display 230 is disposed may be defined to be a front surface of the foldable electronic device 200, and an opposite surface of the front surface may be defined to be a rear surface of the foldable electronic device 200. A surface surrounding a space between the front surface and the rear surface may be defined to be a side surface of the foldable electronic device 200.

Figure 4:
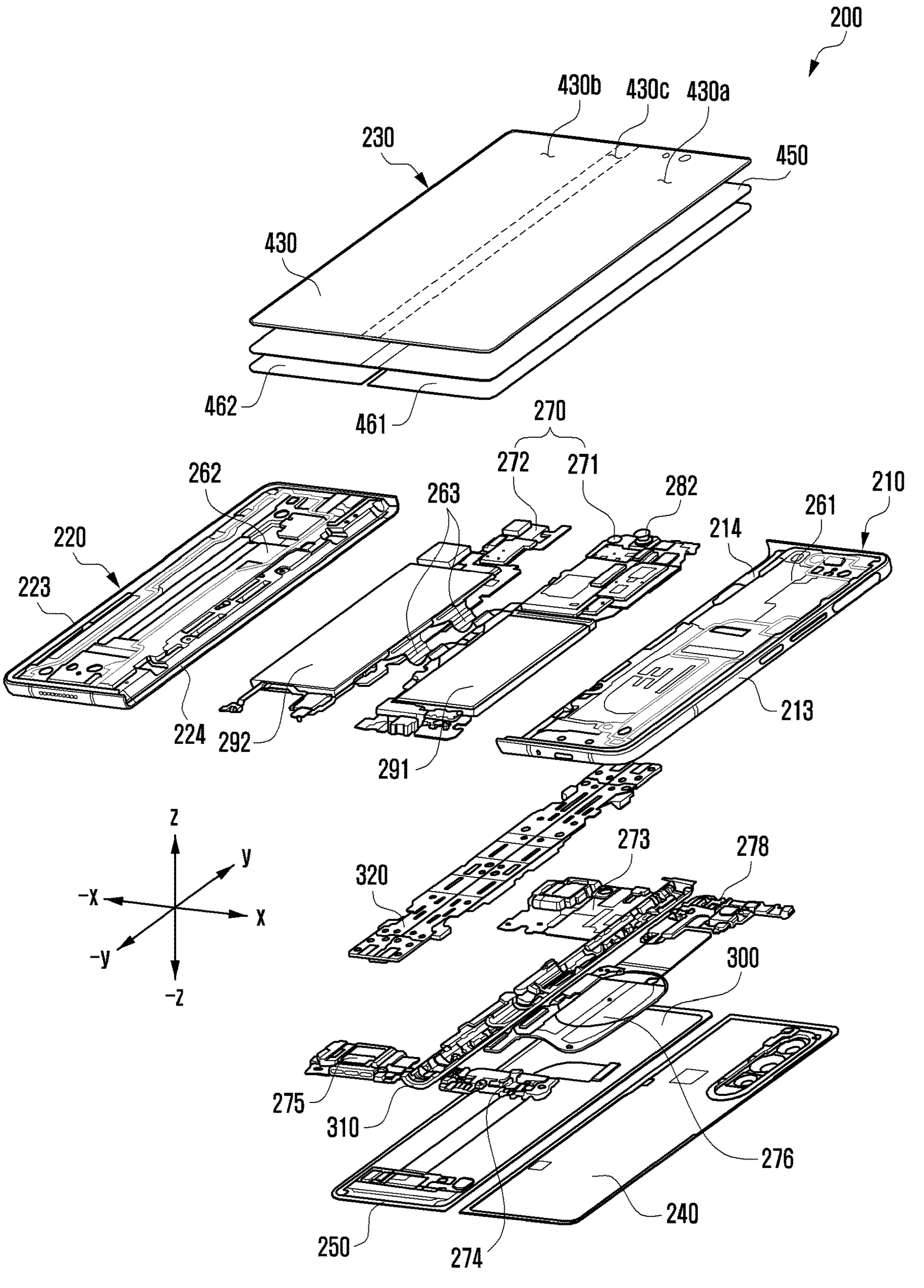
FIG. 4 is a view schematically illustrating a disassembled perspective view of the foldable electronic device according to an embodiment of the disclosure.

According to various embodiments, the pair of housings 210 and 220 may include a first housing 210 and a second housing 220 that are foldably disposed relative to each other by means of a hinge device (e.g., the hinge plate 320 in FIG. 4). The pair of housings 210 and 220 are not limited to the shape and assembly illustrated in FIGS. 2A, 2B, 3A, and 3B, and may be implemented by combinations and/or assemblies of other shapes or components. The first housing 210 and the second housing 220 are disposed on either side with respect to a folding axis A and may have a shape that is generally symmetrical with respect to the folding axis A. According to some embodiments, the first housing 210 and the second housing 220 may be folded asymmetrically with respect to the folding axis A. The first housing 210 and second housing 220 may be at different angles or distances from each other depending on whether the foldable electronic device 200 is in an unfolded state, a folded state, or an intermediate state.

According to various embodiments, in the unfolded state of the foldable electronic device 200, the first housing 210 is connected to the hinge device (e.g., the hinge plate 320 in FIG. 4), and may include a first surface 211 disposed to be directed to a front surface of the electronic device 200, a second surface 212 directed to an opposite direction of the first surface 211, and/or a first lateral member 213 surrounding at least a portion of a first space between the first surface 211 and the second surface 212.

According to an embodiment, the first housing 210 (e.g., the first lateral member 213) may include a first segmenting portion 501 and a second segmenting portion 502. For example, the second segmenting portion 502 may be formed closer to the hinge module 320 than the first segmenting portion 501. A first conductive portion 510 may be disposed between the first segmenting portion 501 and the second segmenting portion 502. A second conductive portion 520 (e.g., an antenna radiator) may be disposed between the second segmenting portion 502 and the hinge module 320. The second conductive portion 520 is electrically connected to the wireless communication module 192 and may perform a function of a first antenna A1.

According to various embodiments, in the unfolded state of the foldable electronic device 200, the second housing 220 is connected to the hinge device (e.g., the hinge plate 320 in FIG. 4), and may include a third surface 221 disposed to be directed to a front surface of the foldable electronic device 200, a fourth surface 222 directed to an opposite direction of the third surface 221, and/or a second lateral member 223 surrounding at least a portion of a second space between the third surface 221 and the fourth surface 222.

According to an embodiment, the second housing 220 (e.g., the second lateral member 223) may include a third segmenting portion 503 and a fourth segmenting portion 504. For example, the third segmenting portion 503 may be formed closer to the hinge module 320 than the fourth segmenting portion 504. A third conductive portion 530 (e.g., an antenna radiator) may be disposed between the third segmenting portion 503 and the fourth segmenting portion 504. The third conductive portion 530 is electrically connected to the wireless communication module 192 and may perform a function of a second antenna A2. A fourth conductive portion 540 may be disposed between the third segmenting portion 503 and the hinge module 320. The fourth conductive portion 540 is electrically connected to the wireless communication module 192 and may perform a function of a third antenna A3. According to various embodiments, the first surface 211 may be directed to substantially the same direction as the third surface 221 in the unfolded state, and may be at least partially facing the third surface 221 in the folded state.

According to various embodiments, the foldable electronic device 200 may include a recess 201 formed to accommodate the flexible display 230 by means of a structural coupling of the first housing 210 and the second housing 220. The recess 201 may have substantially the same size as the flexible display 230.

According to various embodiments, the hinged cover 310 (e.g., the hinge housing) may be disposed between the first housing 210 and the second housing 220. The hinge cover 310 may be disposed to cover a portion (e.g., at least one hinge module) of the hinge device (e.g., the hinge plate 320 in FIG. 4). The hinged cover 310 may be concealed by a portion of the first housing 210 and the second housing 220, or may be exposed to the outside, depending on the unfolded, the folded, or the intermediate state of the foldable electronic device 200.

According to various embodiments, in case that the foldable electronic device 200 is in the unfolded state, at least a portion of the hinged cover 310 may be concealed by the first housing 210 and the second housing 220, not being substantially exposed. In case that the foldable electronic device 200 is in the folded state, at least a portion of the hinged cover 310 may be exposed to the outside between the first housing 210 and the second housing 220. The hinge cover 310 may be at least partially exposed to the outside of the foldable electronic device 200 between the first housing 210 and the second housing 220 in case that the first housing 210 and the second housing 220 are in the intermediate state of being folded with a predetermined angle. For example, an area where the hinge cover 310 is exposed to the outside may be less than a state of being fully folded. The hinge cover 310 may include a curved surface, at least in part.

According to various embodiments, in case that the foldable electronic device 200 is in the unfolded state (e.g., the state of FIGS. 2A and 2B), the first housing 210 and the second housing 220 form an angle of about 180 degrees, and a first area 230*a*, a second area 230*b*, and a folding area 230*c* of the flexible display 230 may be disposed to form a co-planar surface and directed to substantially the same direction (e.g., in the direction of the z-axis). In another embodiment, in case that the foldable electronic device 200 is in the unfolded state, the first housing 210 may be rotated at an angle of about 360 degrees relative to the second housing 220. Therefore, the foldable electronic device 200 may be reversely folded so that the second surface 212 and the fourth surface 222 face each other (e.g., in an out folding manner).

According to various embodiments, in case that the foldable electronic device 200 is in the folded state (e.g., the state of FIGS. 3A and 3B), the first surface 211 of the first housing 210 and the third surface 221 of the second housing 220 may be disposed facing each other. In this case, the first area 230*a* and the second area 230*b* of the flexible display 230 may be disposed to face each other, by means of the folding area 230*c*, forming a narrow angle (e.g., ranging from 0 degrees to about 10 degrees) with each other.

According to various embodiments, at least a portion of the folding area 230*c* may be transformed into a curved shape having a predetermined curvature. The first housing 210 and the second housing 220 may be disposed at a predetermined angle to each other in case that the foldable electronic device 200 is in the intermediate state. In this case, the first area 230*a* and the second area 230*b* of the flexible display 230 may form an angle that is larger than in the folded state and smaller than in the unfolded state, and a curvature of the folding area 230*c* may be smaller than in the folded state and larger than in the unfolded state.

According to various embodiments, the first housing 210 and the second housing 220 may form an angle that the first and second housings may be stopped at a designated folding angle between the folded state and the unfolded state by means of the hinge device (e.g., the hinge plate 320 in FIG. 4) (e.g., a free stop function). In some embodiments, the first housing 210 and the second housing 220 may be continuously operated while under pressure, by means of the hinge device (e.g., the hinge plate 320 in FIG. 4), in either the unfolded or folded direction, based on a designated inflection angle.

According to various embodiments, the foldable electronic device 200 may include at least one of at least one display disposed in the first housing 210 and/or the second housing 220 (e.g., the flexible display 230 and the sub display 300), an input device 215, an acoustic output device 227 and 228, a sensor module 217*a*, 217*b*, and 226, a camera module 216*a*, 216*b*, and 225, a key input device 219, an indicator (not illustrated), or a connector port 229. In some embodiments, the foldable electronic device 200 may omit at least one of the constituent elements that are described above or may additionally include at least one of other constituent elements.

According to various embodiments, the at least one display (e.g., the flexible display 230 and the sub-display 300) may include the flexible display 230 (e.g., a first display) disposed to be supported by the third surface 221 of the second housing 220 by means of the hinge device (e.g., the hinge plate 320 in FIG. 4) from the first surface 211 of the first housing 210, and the sub display 300 (e.g., a second display) disposed to be at least partially visible from the outside through the fourth surface 222 in an inner space of the second housing 220. In some embodiments, the sub display 300 may be disposed to be visible from the outside through the second surface 212 in an inner space of the first housing 210. According to an embodiment, the flexible display 230 may be used mainly in the unfolded state of the foldable electronic device 200, and the sub display 300 may be used mainly in the folded state of the foldable electronic device 200. According to an embodiment, the foldable electronic device 200 may, in case of the intermediate state, control the flexible display 230 and/or the sub display 300 to be usable based on the folding angle of the first housing 210 and the second housing 220.

According to various embodiments, the flexible display 230 may be disposed in an accommodation space formed by the pair of housings 210, 220. For example, the flexible display 230 may be disposed in the recess 201 formed by the pair of housings 210 and 220, and may be disposed to occupy substantially most of the front surface of the foldable electronic device 200 in the unfolded state. According to an embodiment, the flexible display 230 may be transformed into a planar or curved surface in at least some areas. The flexible display 230 may include the first area 230*a* facing the first housing 210, the second area 230*b* facing the second housing 220, and a folding area 230*c* connecting the first area 230*a* and the second area 230*b* and facing the hinge device (e.g., the hinge plate 320 in FIG. 4). According to an embodiment, while it is the flexible display 230 is physically divided into areas by the pair of housings 210 and 220 and the hinge device (e.g., the hinge plate 320 in FIG. 4), the flexible display 230 may substantially be displayed as a single, seamless, full-screen display by the pair of housings 210 and 220 and the hinge device (e.g., the hinge plate 320 in FIG. 4). The first area 230*a* and the second area 230*b* may have shapes that are entirely symmetrical with respect to the folding area 230*c* or may have shapes that are partially asymmetrical.

According to various embodiments, the foldable electronic device 200 may include a first rear surface cover 240 disposed on the second surface 212 of the first housing 210 and a second rear surface cover 250 disposed on the fourth surface 222 of the second housing 220. In some embodiments, at least a portion of the first rear surface cover 240 may be integrally formed with the first lateral member 213. In some embodiments, at least a portion of the second rear surface cover 250 may be formed integrally with the second lateral member 223. According to an embodiment, at least one of the first rear surface cover 240 and the second rear surface cover 250 may be formed by a substantially transparent plate (e.g., a glass plate including various coating layers, or a polymer plate) or an opaque plate.

According to various embodiments, the first rear surface cover 240 may be formed by an opaque plate, such as, for example, a coated or tinted glass, ceramic, polymer, metal (e.g., aluminum, stainless steel (STS), or magnesium), or a combination of at least two of the above materials. The second rear surface cover 250 may be formed by a substantially transparent plate, such as glass or polymer, for example. In this case, the second display 300 may be disposed to be visible from the outside through the second rear surface cover 250 in an inner space of the second housing 220.

According to various embodiments, the input device 215 may include a microphone. In some embodiments, the input device 215 may include a plurality of microphones disposed to detect a direction of sound.

According to various embodiments, the acoustic output devices 227 and 228 may include speakers. According to an embodiment, the acoustic output devices 227 and 228 may include a call receiver disposed through the fourth surface 222 of the second housing 220 and an external speaker disposed through at least a portion of the second lateral member 223 of the second housing 220. In some embodiments, the input device 215, the acoustic output devices 227 and 228, and the connector port 229 are disposed in spaces in the first housing 210 and/or the second housing 220 and may be exposed to an external environment through at least one hole formed in the first housing 210 and/or the second housing 220. In some embodiments, the holes formed in the first housing 210 and/or the second housing 220 may be used in common for the input device 215 and the acoustic output devices 227 and 228. In some embodiments, the acoustic output devices 227 and 228 may include a speaker (e.g., a piezo speaker) that is operated with the holes formed in the first housing 210 and/or the second housing 220 excluded.

According to various embodiments, the camera modules 216*a*, 216*b*, and 225 may include a first camera module 216*a* disposed on the first surface 211 of the first housing 210, a second camera module 216*b* disposed on the second surface 212 of the first housing 210, and/or a third camera module 225 disposed on the fourth surface 222 of the second housing 220. According to an embodiment, the foldable electronic device 200 may include a flash 218 disposed near the second camera module 216*b*. The flash 218 may include, for example, a light-emitting diode or a xenon lamp. According to an embodiment, the camera modules 216*a*, 216*b*, and 225 may include one or a plurality of lenses, an image sensor, and/or an image signal processor. In some embodiments, at least one of the camera modules 216*a*, 216*b*, and 225 may include two or more lenses (e.g., a wide-angle and a telephoto lens) and image sensors, and may be disposed together on either surface of the first housing 210 and/or the second housing 220.

According to various embodiments, the sensor modules 217*a*, 217*b*, and 226 may generate electrical signals or data values that correspond to an internal operational state of the foldable electronic device 200, or an external environmental state. According to an embodiment, the sensor modules 217*a*, 217*b*, and 226 may include a first sensor module 217*a* disposed on the first surface 211 of the first housing 210, a second sensor module 217*b* disposed on the second surface 212 of the first housing 210, and/or a third sensor module 226 disposed on the fourth surface 222 of the second housing 220. In some embodiments, the sensor modules 217*a*, 217*b*, and 226 may include at least one of a gesture sensor, a grip sensor, a color sensor, an infrared (IR) sensor, an illumination sensor, an ultrasonic sensor, an iris recognition sensor, or a distance detection sensor (e.g., a time of flight (TOF) sensor or light detection and ranging (LiDAR)).

According to various embodiments, the foldable electronic device 200 may further include at least one of a sensor module not illustrated, such as a barometric sensor, a magnetic sensor, a biometric sensor, a temperature sensor, a humidity sensor, or a fingerprint recognition sensor. In some embodiments, the fingerprint recognition sensor may be disposed through at least one lateral member of the first lateral member 213 of the first housing 210 and/or the second lateral member 223 of the second housing 220.

According to various embodiments, the key input device 219 may be disposed to be externally exposed through the first lateral member 213 of the first housing 210. According to some embodiments, the key input device 219 may be disposed to be externally exposed through the second lateral member 223 of the second housing 220. In some embodiments, the foldable electronic device 200 may not include some or all of the key input devices 219, and the key input devices 219 that are not included may be implemented in another form, such as soft keys, on the at least one display 230 and 300. In another embodiment, the key input device 219 may be implemented using a pressure sensor included in the at least one display 230 and 300.

According to various embodiments, the connector port 229 may include a connector (e.g., a USB connector or an interface connector port module (IF module)) configured to transmit and/or receive power and/or data with an external electronic device (e.g., the external electronic devices 102, 104, and 108 in FIG. 1). In some embodiments, the connector port 229 may perform functions for transmitting and receiving audio signals with external electronics together, or may further include a separate connector port (e.g., an earjack hole) to perform functions for transmitting and receiving audio signals.

According to various embodiments, at least one camera module 216*a* and 225 of the camera modules 216*a*, 216*b*, and 225, at least one sensor module 217*a* and 226 of the sensor modules 217*a*, 217*b*, and 226, and/or the indicator may be disposed to be exposed through the at least one display 230 and 300. For example, the at least one camera module 216*a* and 225, the at least one sensor module 217*a* and 226, and/or the indicator may be disposed in the inner space of the at least one housing 210 and 220, below an activated area of the at least one display 230 and 300, and may be disposed to be in contact with an external environment through an opening or transparent area perforated through a cover member (e.g., a window layer of the flexible display 230 (not illustrated) and/or the second rear surface cover 250). According to an embodiment, an area where the at least one display 230 and 300 and the at least one camera module 216*a* and 225 face may be formed as a transmissive area having a predetermined transmittance as a portion of an area displaying contents. According to an embodiment, the transmissive area may be formed to have a transmittance in the range of about 5% to about 20%. The transmissive area may include an area that overlaps an effective area (e.g., a field of view area) of the at least one camera module 216*a* and 225 through which light passes and forms an image by an image sensor to create an image. For example, the transmissive area of the at least one display 230 and 300 may include an area with a lower density of pixels than a surrounding area. For example, the transmissive area may replace the opening. For example, the at least one camera module 216*a* and 225 may include an under display camera (UDC) or an under panel camera (UPC). In another embodiment, some of the camera modules or sensor modules 217*a* and 226 may be disposed to perform functions without being visually exposed through the display. For example, an area that faces the camera module 216*a* and 225 and/or sensor module 217*a* and 226 disposed below the at least one display 230 and 300 (e.g., a display panel) may be an under display camera (UDC) structure, in which a perforated opening may not be necessary.

FIG. 4 is a view schematically illustrating a disassembled perspective view of the foldable electronic device according to an embodiment of the disclosure.

Referring to FIG. 4, the foldable electronic device 200 may include the flexible display 230 (e.g., the first display), the sub display 300 (e.g., the second display), the hinge plate 320, a pair of support members (e.g., a first support member 261 and a second support member 262), at least one substrate 270 (e.g., a printed circuit board (PCB)), the first housing 210, the second housing 220, the first rear surface cover 240, and/or the second rear surface cover 250.

According to various embodiments, the flexible display 230 may include a display panel 430 (e.g., a flexible display panel), a support plate 450 disposed at a lower portion of the display panel 430 (e.g., in the −z-axis direction), and a pair of metal plates 461 and 462 disposed at a lower portion of the support plate 450 (e.g., in the −z-axis direction).

According to various embodiments, the display panel 430 may include a first panel area 430*a* corresponding to a first area of the flexible display 230 (e.g., the first area 230*a* in FIG. 2A), a second panel area 430*b* extending from the first panel area 430*a* and corresponding to a second area of the flexible display 230 (e.g., the second area 230*b* in FIG. 2A), and a third panel area 430*c* connecting the first panel area 430*a* and the second panel area 430*b* and corresponding to a folding area (e.g., the folding area 230*c* in FIG. 2A).

According to various embodiments, the support plate 450 is disposed between the display panel 430 and the pair of support members 261 and 262 and may be formed to have a material and shape to provide a planar support structure for the first panel area 430*a* and the second panel area 430*b* and a bendable structure to aid in flexibility for the third panel area 430*c*. According to an embodiment, the support plate 450 may be formed of a conductive material (e.g., metal) or a non-conductive material (e.g., polymer or fiber reinforced plastics (FRP)). According to an embodiment, the pair of metal plates 461 and 462 may include a first metal plate 461 disposed to correspond with at least a portion of the first panel area 430*a* and the third panel area 430*c*, between the support plate 450 and the pair of support members 261 and 262, and a second metal plate 462 disposed to correspond with at least a portion of the second panel area 430*b* and the third panel area 430*c*. According to an embodiment, the pair of metal plates 461 and 462 may be formed of a metallic material (e.g., SUS) to help provide ground connection structure and rigidity for the flexible display 230.

According to various embodiments, the sub display 300 may be disposed in a space between the second housing 220 and the second rear surface cover 250. According to an embodiment, the sub display 300 may be disposed in a space between the second housing 220 and the second rear surface cover 250 to be visible from the outside through substantially the entire area of the second rear surface cover 250.

According to various embodiments, at least a portion of the first support member 261 may be foldably coupled to the second support member 262 by means of the hinge plate 320. According to an embodiment, the foldable electronic device 200 may include at least one wiring member 263 (e.g., a flexible printed circuit board (FPCB)) disposed from at least a portion of the first support member 261, across the hinge plate 320, to a portion of the second support member 262. According to an embodiment, the first support member 261 may extend from the first lateral member 213, or may be disposed in a manner that is structurally coupled to the first lateral member 213. According to an embodiment, the foldable electronic device 200 may include the first support member 261 and the first space provided through the first rear surface cover 240 (e.g., the first space 2101 in FIG. 2A).

According to various embodiments, the first housing 210 (e.g., a first housing structure) may be constituted by coupling the first lateral member 213, the first support member 261, and the first rear surface cover 240. According to an embodiment, the second support member 262 may extend from the second lateral member 223, or may be disposed in a manner that is structurally coupled to the second lateral member 223. According to an embodiment, the foldable electronic device 200 may include the second support member 262 and the second space provided through the second rear surface cover 250 (e.g., the second space 2201 in FIG. 2A).

According to various embodiments, the second housing 220 (e.g., a second housing structure) may be constituted by coupling the second lateral member 223, the second support member 262, and the second rear surface cover 250. According to an embodiment, at least one wiring member 263 and/or at least a portion of the hinge plate 320 may be disposed to be supported by at least a portion of the pair of support members 261 and 262. According to an embodiment, the at least one wiring member 263 may be disposed in a direction (e.g., in the x-axis direction) across the first support member 261 and the second support member 262. According to an embodiment, the at least one wiring member 263 may be disposed in a direction (e.g., in the x-axis direction) substantially perpendicular to the folding axis (e.g., the y-axis or the folding axis A in FIG. 2A).

According to various embodiments, at least one substrate 270 may include a first printed circuit board 271 disposed in the first space 2101 and a second printed circuit board 272 disposed in the second space 2201. According to an embodiment, the first printed circuit board 271 and the printed circuit board 272 may include at least one electronic component that is disposed to implement various functions of the foldable electronic device 200. According to an embodiment, the first printed circuit board 271 and the printed circuit board 272 may be electrically connected by means of the at least one wiring member 263. In an embodiment, the camera module 282 may be disposed on the first printed circuit board 271.

According to various embodiments, the foldable electronic device 200 may include at least one battery 291 and 292. According to an embodiment, the at least one battery 291 and 292 may include a first battery 291 disposed in the first space 2101 of the first housing 210 and electrically connected to the first printed circuit board 271 and a second battery 292 disposed in the second space 2201 of the second housing 220 and electrically connected to the second printed circuit board 272. According to an embodiment, the first support member 261 and the second support member 262 may further include at least one swelling hole for the first battery 291 and the second battery 292.

According to various embodiments, the first housing 210 may include a first rotational support surface 214, and the second housing 220 may include a second rotational support surface 224. According to an embodiment, the first rotational support surface 214 and the second rotational support surface 224 may include curved surfaces that correspond to the curved outer surface of the hinge cover 310. According to an embodiment, the first rotational support surface 214 and the second rotational support surface 224 may cover the hinge cover 310 in case that the foldable electronic device 200 is in the unfolded state, thereby not exposing or only partially exposing the hinge cover 310 to the rear surface of the foldable electronic device 200. According to an embodiment, the first rotational support surface 214 and the second rotational support surface 224 may rotate along the curved outer surface of the hinge cover 310 in case that the foldable electronic device 200 is in the folded state, exposing the hinge cover 310 at least partially to the rear surface of the foldable electronic device 200.

According to various embodiments, the foldable electronic device 200 may include at least one antenna 276 disposed in the first space 2101. According to an embodiment, the at least one antenna 276 may be disposed in the first space 2101, between the first battery 291 and the first rear surface cover 240. According to an embodiment, the at least one antenna 276 may include, for example, a near field communication (NFC) antenna, a wireless charging antenna, and/or a magnetic secure transmission (MST) antenna. According to an embodiment, the at least one antenna 276 may wirelessly transmit and receive power for charging, for example, or for short-range communication with an external device. In some embodiments, an antenna structure may be formed by the first lateral member 213 or at least a portion of the second lateral member 223 and/or the first support member 261 and a portion of the second support member 262, or a combination thereof.

According to various embodiments, the foldable electronic device 200 may further include at least one electronic component assembly 274 and 275 and/or additional support members 278 and 273 disposed in the first space 2101 and/or the second space 2201. For example, the at least one electronic component assembly 274 and 275 may include an interface connector port assembly or a speaker assembly.

Figure 5:
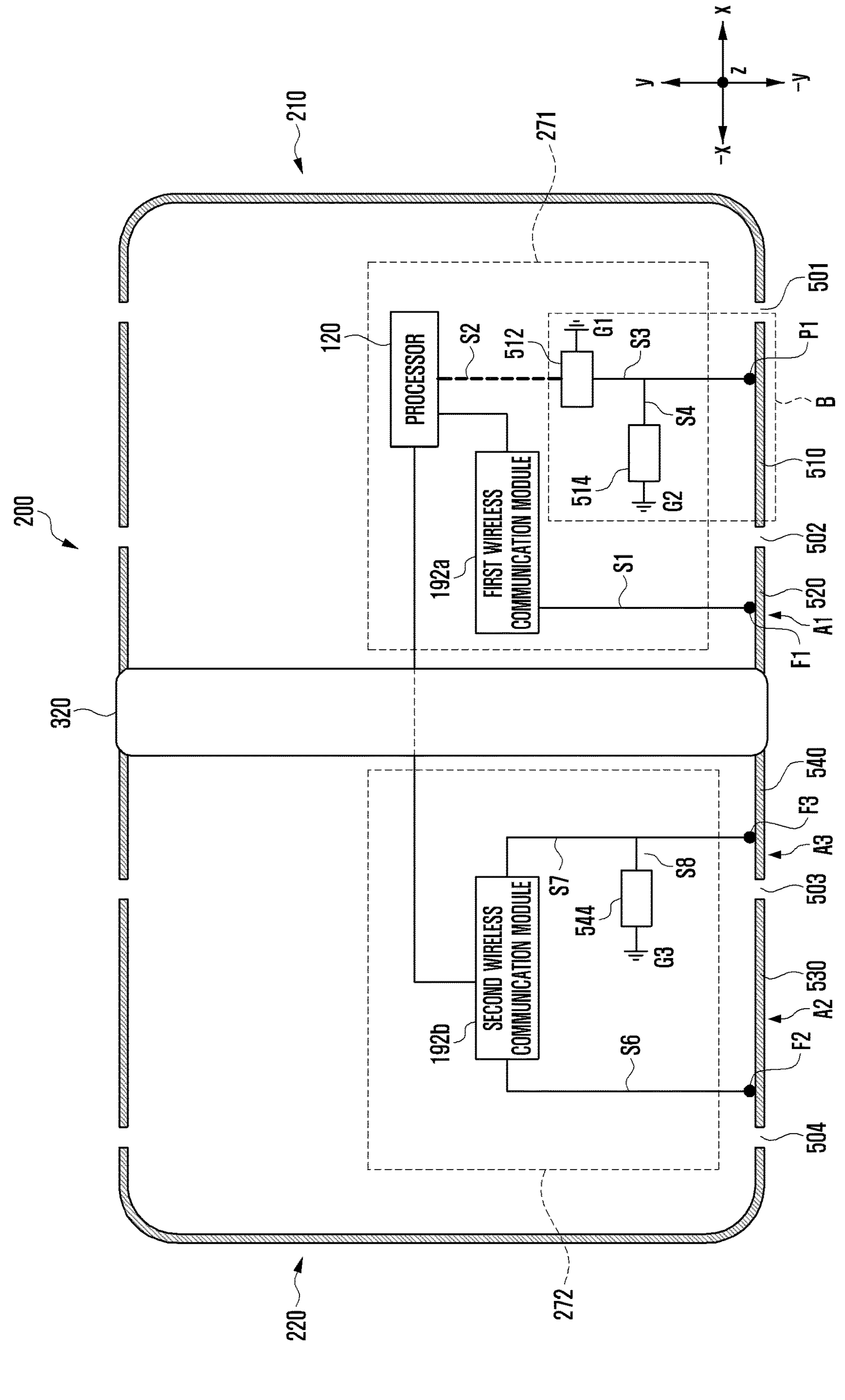
FIG. 5 is a view schematically illustrating a portion of the foldable electronic device including a first housing and a second housing, according to an embodiment of the disclosure.

FIG. 5 is a view schematically illustrating a portion of the foldable electronic device including a first housing and a second housing, according to an embodiment of the disclosure.

According to an embodiment, FIG. 5 may be a schematic view illustrating a constitution of the hinge module 320, the first housing 210, and the second housing 220 as viewed in one direction (e.g., z-axis direction) when the foldable electronic device 200 illustrated in FIG. 2A, according to various embodiments of the disclosure, is in the unfolded state.

According to various embodiments, the foldable electronic device 200 disclosed hereinafter may include embodiments of the electronic devices 101 and 200 disclosed in FIGS. 1, 2A, 2B, 3A, 3B, and 4. In the description of the foldable electronic device 200 disclosed below, constituent elements that are substantially the same as the embodiments disclosed in FIGS. 1, 2A, 2B, 3A, 3B, and 4 are given the same reference numerals, and redundant descriptions of the functions thereof may be omitted.

According to an embodiment, while the embodiment relating to the foldable electronic device 200 disclosed in FIG. 5 describes a structure in which the first housing 210 and the second housing 220 are unfolded and folded in a horizontal direction (e.g., in the x-axis direction and the −x-axis direction), it may be substantially equally applicable to a foldable electronic device having a structure that is unfolded and folded in a vertical direction (e.g., in the y-axis direction and the −y-axis direction).

Referring to FIG. 5, the foldable electronic device 200 according to an embodiment of the disclosure may include the hinge module 320, the first housing 210, and the second housing 220.

According to an embodiment, the first housing 210 and the second housing 220 may be operated in an unfolded state (e.g., see FIG. 2A) or a folded state (e.g., see FIG. 3A) relative to the hinge module 320. The hinge module 320 may rotatably couple the first housing 210 and the second housing 220. The first housing 210 may be at least partially coupled to a first side of the hinge module 320. The second housing 220 may be at least partially coupled to a second side of the hinge module 320.

According to an embodiment, when the foldable electronic device 200 is in the unfolded state, the first housing 210 and the second housing 220 may form an angle of about 180° to be substantially a planar surface. When the foldable electronic device 200 is in the folded state, the first housing 210 and the second housing 220 may be disposed to face each other.

According to an embodiment, the first housing 210 (e.g., the first lateral member 213 in FIG. 2A) may include the first segmenting portion 501, the second segmenting portion 502, the first conductive portion 510, the second conductive portion 520 (e.g., a first antenna), and/or a first printed circuit board 271. In an embodiment, the first printed circuit board 271 may be disposed with the processor 120, a first wireless communication module 192*a* (e.g., wireless communication circuit), a matching circuit 512, and/or a first filter circuit 514. For example, the first printed circuit board 271 may include at least one of a first ground G1 and a second ground G2.

According to an embodiment, the first segmenting portion 501 and the second segmenting portion 502 may be formed in a downward direction (e.g., in the −y axis direction) of the first housing 210. For example, the second segmenting portion 502 may be formed closer to the hinge module 320 than the first segmenting portion 501.

According to an embodiment, the first conductive portion 510 may be disposed between the first segmenting portion 501 and the second segmenting portion 502. The second conductive portion 520 (e.g., an antenna radiator) may be disposed between the second segmenting portion 502 and the hinge module 320. The second conductive portion 520 is electrically connected to the first wireless communication module 192*a* via a first feed point F1 and a first signal path S1, and may perform a function of a first antenna A1.

According to an embodiment, the processor 120 may be electrically connected to the first wireless communication module 192*a*, the matching circuit 512, and/or the first filter circuit 514. For example, the processor 120 may be connected to the matching circuit 512 via a second signal path S2. For example, the processor 120 may control the first wireless communication module 192*a*, the matching circuit 512, and/or the first filter circuit 514. For example, the processor 120 may include a communications processor and/or a radio frequency IC (RFIC).

According to various embodiments, the processor 120 may control the first wireless communication module 192*a* to transmit a feeding signal to the first feed point F1 of the second conductive portion 520.

According to an embodiment, the first wireless communication module 192*a* may be electrically connected to the second conductive portion 520 (e.g., the first antenna A1) via the first signal path S1 and the first feed point F1. The first wireless communication module 192*a* may be electrically connected to the processor 120. The first wireless communication module 192*a* may allow the second conductive portion 520 (e.g., the first antenna A1) to transmit and/or receive wireless signals under the control of the processor 120. The first wireless communication module 192*a* may be electrically coupled to the first feed point F1 using, for example, a conductive member (e.g., a contact pad, a coupling member, a C-clip, or a conductive foam spring).

According to various embodiments, the first wireless communication module 192*a* may be disposed at least one or more on the first printed circuit board 271. In an embodiment, a second wireless communication module 192*b* may be disposed at least one or more on a second printed circuit board 272 of the second housing 220. In various embodiments, the second wireless communication module 192*b* may be electrically connected to at least one of a second feed point F2 of a third conductive portion 530 and a third feed point F3 of a fourth conductive portion 540, as described below, using a conductive member (e.g., a contact pad, a coupling member, a C-clip, or a conductive foam spring).

According to an embodiment, the matching circuit 512 may be electrically connected to the processor 120 via the second signal path S2. For example, the matching circuit 512 may be operated under the control of the processor 120. The matching circuit 512 may be electrically connected to the first conductive portion 510 via a third signal path S3 and a first point P1. The matching circuit 512 may control an electrical characteristic of the first conductive portion 510. For example, the matching circuit 512 may adjust a resonant length of the first conductive portion 510. For example, the matching circuit 512 may control parasitic resonance and current flow in the first conductive portion 510. The matching circuit 512 may be electrically connected to the first ground G1. In an embodiment, the matching circuit 512 may adjust an electrical length of the first conductive portion 510 using at least one switch (e.g., a switch 610 in FIG. 6) and at least one lumped element (e.g., an inductor (e.g., inductors 621, 623, and 625 in FIG. 6) and/or a capacitor (e.g., a capacitor 605 in FIG. 6)). For example, the matching circuit 512 may utilize at least one switch and at least one lumped element to connect or disconnect electrical signals entering the ground G1 via the third signal path S3. The matching circuit 512 may be disposed between the first ground G1 and the first conductive portion 510. The matching circuit 512 may be disposed between the processor 120 and the first conductive portion 510. For example, the matching circuit 512 may be constituted to electrically connect, or electrically disconnect, the first conductive portion 510 and the first ground G1 under the control of the processor 120.

According to various embodiments, when the first housing 210 and the second housing 220 are in the folded state, in case that the first conductive portion 510 of the first housing 210 and the third conductive portion 530 of the second housing 220 (e.g., the second antenna A2) overlap or face each other, the matching circuit 512 may be operating, for example, in response to the control of the processor 120, to change inductance and capacitance values of at least one switch (e.g., the switch 610 in FIG. 6), at least one lumped element (e.g., an inductor (e.g., the inductors 621, 623, and 625 in FIG. 6), and/or a capacitor (e.g., the capacitor 605 in FIG. 6)), and to reduce the influence on radiating performance of the third conductive portion 530 (e.g., the second antenna A2). For example, in case that the first conductive portion 510 of the first housing 210 and the third conductive portion 530 of the second housing 220 (e.g., the second antenna A2) overlap or face each other, the matching circuit 512 may be operating to adjust an electrical characteristic and resonance length of the first conductive portion 510 to eliminate noise (e.g., a parasitic resonance) transmitted through the first conductive portion 510 to the third conductive portion 530 (e.g., the second antenna), and to reduce the influence on an operating frequency of the third conductive portion 530 (e.g., the second antenna) by controlling an electrical element.

According to an embodiment, the first filter circuit 514 (e.g., an interference rejection circuit) may be electrically connected to the third signal path S3 that electrically connects the first conductive portion 510 and the matching circuit 512. For example, the first filter circuit 514 may have a first portion electrically connected to the third signal path S3 between the first point P1 and the matching circuit 512 via the fourth signal path S4, and a second portion electrically connected to the second ground G2. In an embodiment, the first filter circuit 514 may include at least one capacitor (e.g., capacitors 631 and 633 in FIG. 6) and at least one inductor (e.g., an inductor 635 in FIG. 6).

According to various embodiments, the first filter circuit 514 may be operated independently of the matching circuit 512. For example, the first filter circuit 514 may be operated to be unaffected by changes in the inductance and capacitance values of the matching circuit 512. The first filter circuit 514 may ensure isolation of the second conductive portion 520 (e.g., the first antenna) that is adjacent to the first conductive portion 510 with the second segmenting portion 502 interposed therebetween. The first filter circuit 514 may enable the second conductive portion 520 (e.g., the first antenna A1) to operate independently and without the influence of the first conductive portion 510.

According to an embodiment, the first filter circuit 514 may filter electrical signals from the first conductive portion 510 in a band substantially equal to an operating frequency of the second conductive portion 520 (e.g., the first antenna A1). For example, the first filter circuit 514 may operate to remove and filter noise (e.g., a parasitic resonance) transmitted to the second conductive portion 520 (e.g., the first antenna) through the first conductive portion 510 so as not to affect the operating frequency of the second conductive portion 520 (e.g., the first antenna A1). For example, the first filter circuit 514 may filter frequency components other than the operating frequency of the second conductive portion 520 (e.g., the first antenna A1). In an embodiment, the first filter circuit 514 may include at least one of a diplexer, a low pass filter (LPF), and a high pass filter (HPF).

According to an embodiment, the second housing 220 (e.g., the second lateral member 223 in FIG. 2A) may include the third segmenting portion 503, the fourth segmenting portion 504, the third conductive portion 530, the fourth conductive portion 540, and/or the second printed circuit board 272. In an embodiment, the second printed circuit board 272 may be disposed with the second wireless communication module 192*b* (e.g., wireless communication circuit) and a second filter circuit 544. For example, the second printed circuit board 272 may include a third ground G3. According to various embodiments, the second housing 220 is not limited to the third segmenting portion 503 and the fourth segmenting portion 504, but may further include other segmenting portions.

According to an embodiment, the third segmenting portion 503 and the fourth segmenting portion 504 may be formed in a downward direction (e.g., in the −y axis direction) of the second housing 220. For example, the third segmenting portion 503 may be formed closer to the hinge module 320 than the fourth segmenting portion 504.

According to an embodiment, the third conductive portion 530 (e.g., the second antenna A2) may be disposed between the third segmenting portion 503 and the fourth segmenting portion 504. For example, the fourth conductive portion 540 may be disposed between the third segmenting portion 503 and the hinge module 320. According to an embodiment, the third conductive portion 530 is electrically connected to the second wireless communication module 192*b* via the second feed point F2 and a sixth signal path S6 and may perform a function of the second antenna A2. The second wireless communication module 192*b* may be electrically connected to the processor 120. The processor 120 may control the second wireless communication module 192*b* to transmit a feeding signal to the second feed point F2 of the third conductive portion 530.

According to an embodiment, the fourth conductive portion 540 is electrically connected to the second wireless communication module 192*b* via the third feed point F3 and a seventh signal path S7 and may perform a function of the third antenna A3. The processor 120 may control the second wireless communication module 192*b* to transmit a feeding signal to the third feed point F3 of the fourth conductive portion 540.

According to an embodiment, the second filter circuit 544 may be electrically connected to the seventh signal path S7 that electrically connects the second wireless communication module 192*b* and the fourth conductive portion 540. For example, the second filter circuit 544 may have a first portion electrically connected to the seventh signal path S7 between the third feed point F3 and the second wireless communication module 192*b* via an eighth signal path S8, and a second portion electrically connected to the third ground G3. The second filter circuit 544 may include, for example, at least one capacitor (e.g., the capacitors 631 and 633 in FIG. 6) and at least one inductor (e.g., the inductor 635 in FIG. 6).

According to an embodiment, the second filter circuit 544 may enable the fourth conductive portion 540 to be shorted in response to the control of the processor 120 or the second wireless communication module 192*b*. The second filter circuit 544 may ensure isolation of the third conductive portion 530 (e.g., the second antenna) that is adjacent to the fourth conductive portion 540 (e.g., the third antenna) with the third segmenting portion 503 interposed therebetween. The second filter circuit 544 may support the third conductive portion 530 (e.g., the second antenna) to operate independently without the influence of the fourth conductive portion 540 (e.g., the third antenna). The second filter circuit 544 may operate to remove and filter noise (e.g., a parasitic resonance) transmitted to the third conductive portion 530 (e.g., the second antenna) through the fourth conductive portion 540 (e.g., the third antenna A3) so as not to affect an operating frequency of the third conductive portion 530 (e.g., the second antenna). For example, the second filter circuit 544 may filter frequency components other than an operating frequency of the fourth conductive portion 540 (e.g., the third antenna A3).

According to various embodiments, when the first housing 210 and the second housing 220 are in the folded state, in case that the second conductive portion 520 (e.g., the first antenna A1) of the first housing 210 and the fourth conductive portion 540 (e.g., the third antenna A3) of the second housing 220 overlap or face each other, the second filter circuit 544 may operate to remove and filter noise transmitted to the second conductive portion 520 (e.g., the first antenna A1) through the fourth conductive portion 540 (e.g., the third antenna A3) so that the fourth conductive portion 540 (e.g., the third antenna A3) does not affect the operating frequency of the second conductive portion 520 (e.g., the first antenna). The second filter circuit 544 may include at least one of, for example, a diplexer, a low pass filter (LPF), and a high pass filter (HPF).

Figure 6:
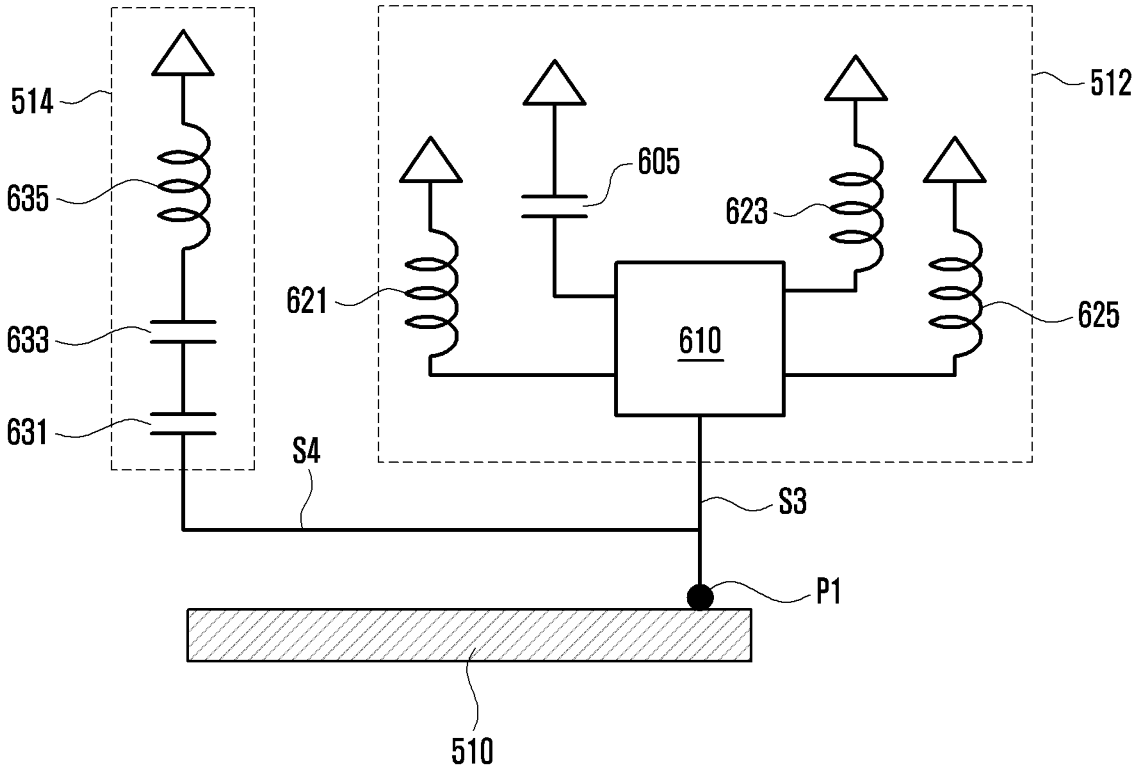
FIG. 6 is a view illustrating a constitution of portion B of the foldable electronic device illustrated in FIG. 5, according to an embodiment of the disclosure.

FIG. 6 is a view illustrating a constitution of portion B of the foldable electronic device illustrated in FIG. 5, according to an embodiment of the disclosure.

According to various embodiments, FIG. 6 may be a view illustrating the constitution of the matching circuit 512 and the first filter circuit 514 of the foldable electronic device 200 illustrated in FIG. 5, according to an embodiment of the disclosure.

Referring to FIG. 6, the matching circuit 512 according to an embodiment of the disclosure may include the switch 610 and at least one lumped element (e.g., a capacitor 605, a first inductor 621, a second inductor 623, and/or a third inductor 625).

According to an embodiment, the switch 610 may be electrically connected with the capacitor 605, the first inductor 621, the second inductor 623, and the third inductor 625. For example, the switch 610 may include a single pole fourth throw (SP4T) switch. In an embodiment, the switch 610 may select and adjust the time constant of the capacitor 605, the first inductor 621, the second inductor 623, and the third inductor 625. In various embodiments, the matching circuit 512 may include at least one switch 610.

According to an embodiment, the matching circuit 512 may determine capacitance and inductance values of the capacitor 605, the first inductor 621, the second inductor 623, and the third inductor 625 so that an electrical characteristic (e.g., electrical length) of the first conductive portion 510 may be controlled. For example, matching circuit 512 may determine capacitance and inductance values of the capacitor 605, the first inductor 621, the second inductor 623, and the third inductor 625 based on the operating frequency of the third conductive portion 530 (e.g., the second antenna). In an embodiment, the matching circuit 512 has been described as including the capacitor 605, the first inductor 621, the second inductor 623, and the third inductor 625, but may include any combination of at least one capacitor and/or at least one inductor, without being limited to the number described above, as long as the electrical characteristics of the first conductive portion 510 may be controlled.

According to an embodiment, the first filter circuit 514 may be electrically connected to the third signal path S3 between the first conductive portion 510 and the matching circuit 512 using the fourth signal path S4. In an embodiment, the first filter circuit 514 may be constituted that the first capacitor 631, the second capacitor 633, and the inductor 635 are connected in series. In an embodiment, the capacitance value of the first capacitor 631 and the second capacitor 633 of the first filter circuit 514 and the inductance value of the inductor 635 may change, for example, depending on the operating frequency of the second conductive portion 520 (e.g., the first antenna). In an embodiment, the first filter circuit 514 has been described as including the first capacitor 631, the second capacitor 633, and the inductor 635, but may include any combination of at least one capacitor and/or at least one inductor, without being limited to the number described above, as long as the isolation of the second conductive portion 520 (e.g., the first antenna) can be ensured. According to various embodiments, the constitution of the first filter circuit 514 described above may be substantially similarly applied to the second filter circuit 544. In an embodiment, the second filter circuit 544 may determine which lumped elements are included based on an operating frequency of the first antenna A1 including the second conductive portion 520.

Figure 7:
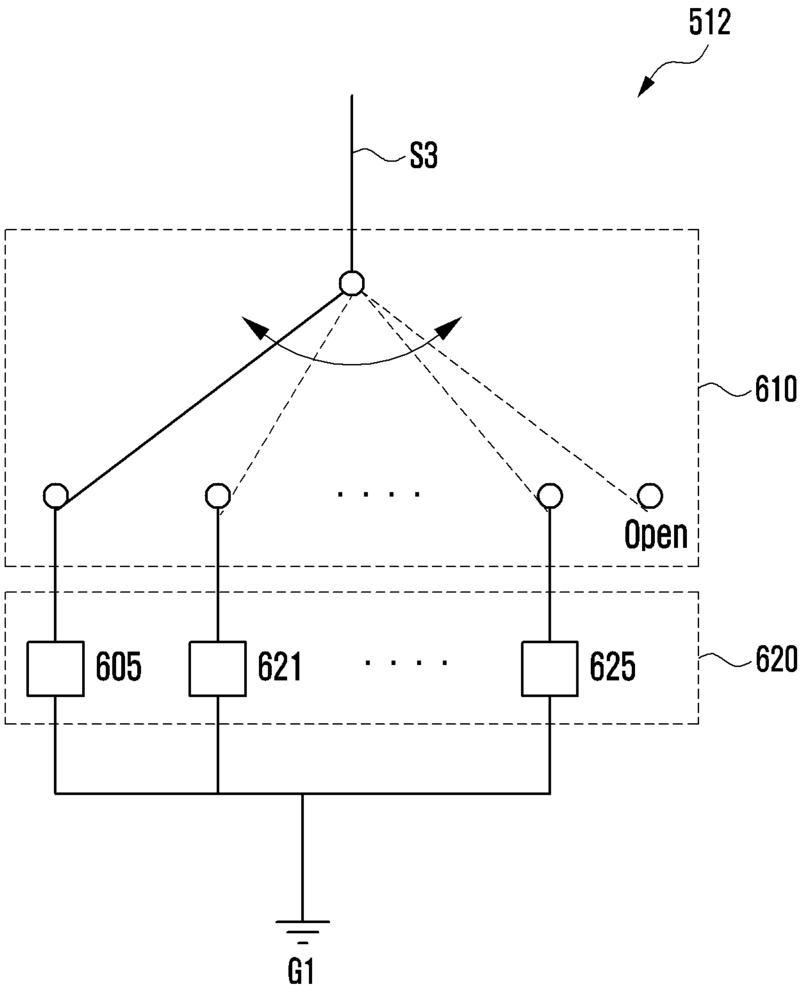
FIG. 7 is a view schematically illustrating a constitution of a matching circuit according to an embodiment of the disclosure.

FIG. 7 is a view schematically illustrating a constitution of the matching circuit according to an embodiment of the disclosure.

Referring to FIG. 7, the matching circuit 512 according to various embodiments of the disclosure may include at least one switch 610, or at least one passive element 620 that is electrically connected to a signal path (e.g., the third signal path S3) by the at least one switch 610, or that disconnects the electrical path (e.g., the example in FIG. 6: the capacitor 605, the first inductor 621, the second inductor 623, the third inductor 625, or open)). The at least one passive element 620 may have different element values. The at least one passive element 620 (e.g., a lumped element) may include capacitors having various capacitance values (e.g., the capacitor 605 in FIG. 6) and/or inductors having various inductance values (e.g., the inductors 621, 623, and 625 in FIG. 6). The at least one switch 610 may selectively connect an element having a designated element value (e.g., a matching value) to the third signal path S3 under the control of the processor 120. In an embodiment, the at least one switch 610 may include a micro-electro mechanical systems (MEMS) switch. The MEMS switch performs a mechanical switching operation by an internal metal plate, which has a complete turn on/off characteristic, and thus may substantially not affect changes in the radiation characteristics of the antenna. In some embodiments, the at least one switch 610 may include a single pole single throw (SPST), a single pole double throw (SPDT), or a switch including three or more throws (e.g., SP4T).

Figure 8A:
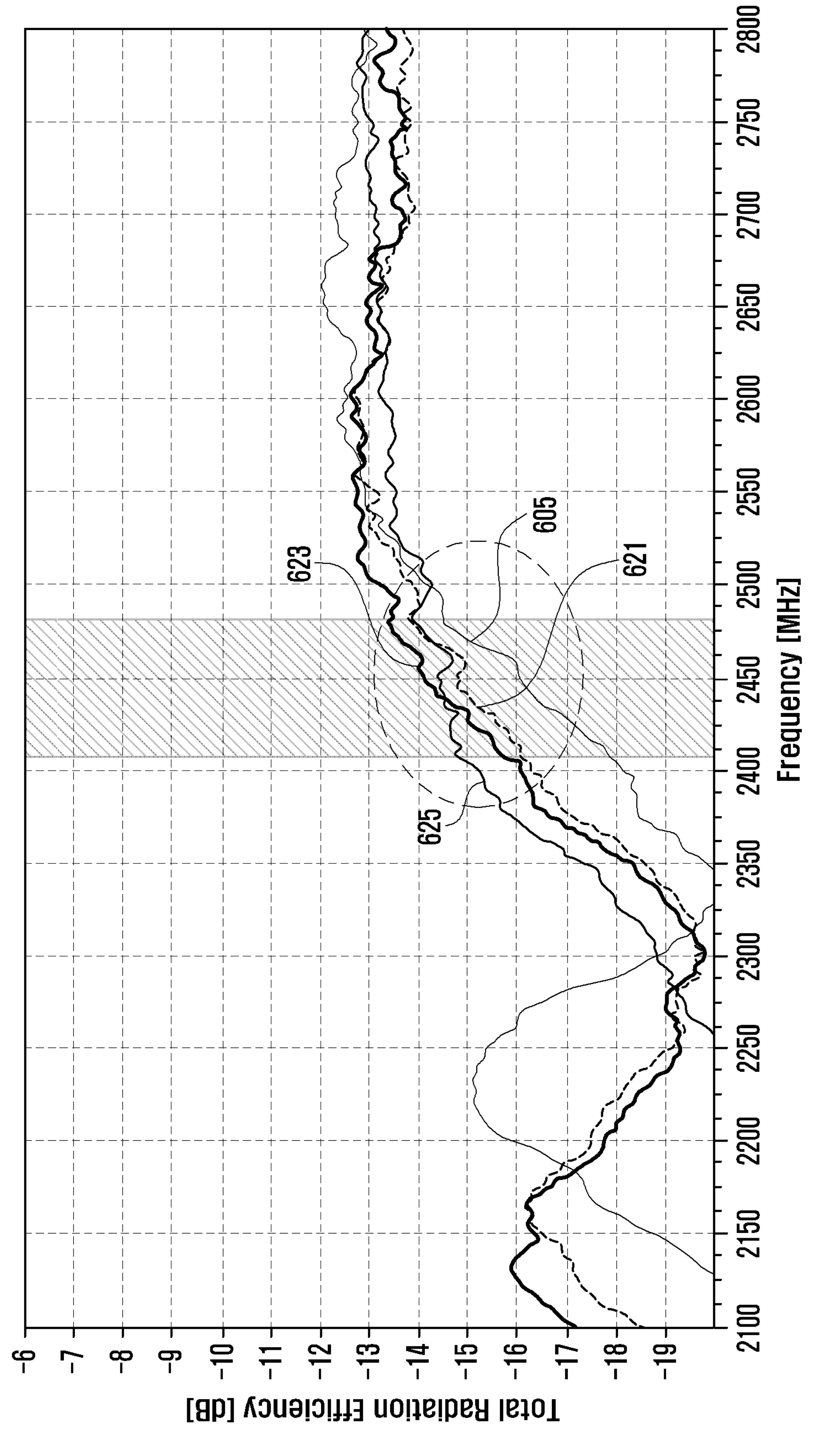
FIG. 8A is a view illustrating a change in radiation performance of a first antenna including a second conductive portion in response to an operating condition of the matching circuit of the foldable electronic device that does not include a first filter circuit, according to an embodiment of the disclosure.
Figure 8B:
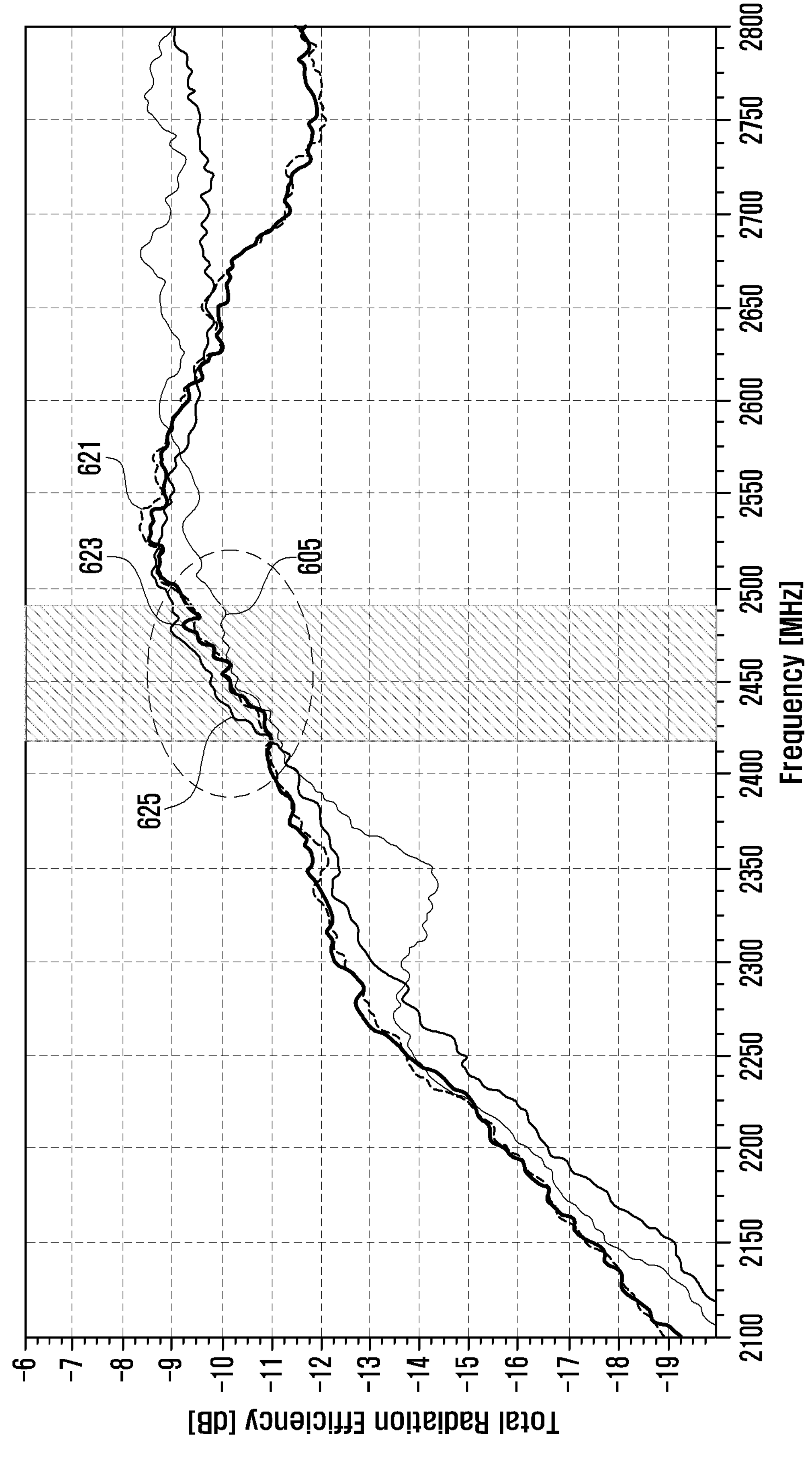
FIG. 8B is a view illustrating a change in radiation performance of a first antenna including a second conductive portion in response to an operating condition of the matching circuit of the foldable electronic device that includes a first filter circuit, according to an embodiment of the disclosure.

FIG. 8A is a view illustrating a change in radiation performance of the first antenna including the second conductive portion in response to an operating condition of the matching circuit of the foldable electronic device that does not include the first filter circuit, according to an embodiment of the disclosure. FIG. 8B is a view illustrating a change in radiation performance of a first antenna including a second conductive portion in response to an operating condition of the matching circuit of the foldable electronic device that includes the first filter circuit, according to an embodiment of the disclosure.

According to an embodiment, the foldable electronic device according to the comparative embodiment may not include the first filter circuit 514 according to an embodiment of the disclosure.

Referring to FIG. 8A, in the foldable electronic device according to the comparative embodiment that does not include the first filter circuit 514 according to an embodiment of the disclosure, radiation performance of the first antenna A1 including the second conductive portion 520 may be degraded due to an electrical component of the first conductive portion 510, and it may be identified that deviation in radiation performance are more likely to occur depending on a situation of being electrically connected to a ground (e.g., the first ground G1) via at least one of the capacitor 605, the first inductor 621, the second inductor 623, and/or the third inductor 625 included in the matching circuit 512.

For example, in the foldable electronic device according to the comparative embodiment, radiation efficiency may be degraded in the band from about 2400 megahertz (MHz) to 2480 MHz, which is the operating frequency of the first antenna A1 including the second conductive portion 520, due to the electrical components of the first conductive portion 510, and deviation in radiation performance may occur significantly depending on an operating condition of the capacitor 605, the first inductor 621, the second inductor 623, and/or the third inductor 625 included in the matching circuit 512.

According to an embodiment, when the first housing 210 and the second housing 220 are in the folded state, the first conductive portion 510 of the first housing 210 and the third conductive portion 530 of the second housing 220 (e.g., the second antenna A2) may overlap. In this case, in order to prevent degradation of the radiation performance of the second antenna A2 including the third conductive portion 530, when a state of electrical connection between the first conductive portion 510 and the first ground G1 changes via the capacitor 605, the first inductor 621, the second inductor 623, and/or the third inductor 625 of the matching circuit 512 connected to the first conductive portion 510, an electrical characteristic of the first conductive portion 510 changes, which may affect the first antenna A1 including the second conductive portion 520. For example, when the first antenna A1 including the second conductive portion 520 is affected by the change in electrical characteristics of the first conductive portion 510, the radiation performance of the first antenna A1 including the second conductive portion 520 may be degraded.

According to various embodiments, the foldable electronic device 200 according to an embodiment of the disclosure may utilize the first filter circuit 514 electrically connected to the first conductive portion 510 to reduce or prevent degradation of the radiation performance of the first antenna A1 including the second conductive portion 520. For example, the first filter circuit 514 may filter electrical signals from the first conductive portion 510 in a band substantially equal to the operating frequency of the first antenna A1 including the second conductive portion 520.

Referring to FIG. 8B, in the foldable electronic device 200 according to an embodiment of the disclosure including the first filter circuit 514 in the first conductive portion 510, the radiation performance of the first antenna A1 including the second conductive portion 520 is improved by filtering the electrical signals of the first conductive portion 510 using the first filter circuit 514, and it may be identified that very little deviation in radiation performance occurs depending on the state of the electrical connection between the first conductive portion 510 and the first ground G1 via the capacitor 605, the first inductor 621, the second inductor 623, and/or the third inductor 625 included in the matching circuit 512.

For example, in the foldable electronic device 200 according to an embodiment of the disclosure, the radiation efficiency is improved in the band from about 2400 MHz to 2480 MHz, which is the operating frequency of the first antenna A1 including the second conductive portion 520, by filtering the electrical signal of the first conductive portion 510 using the first filter circuit 514, and changes in the state of electrical connection between the first conductive portion 510 and the first ground G1 via the capacitor 605, the first inductor 621, the second inductor 623, and/or the third inductor 625 included in the matching circuit 512 may cause little deviation in radiation performance.

Figure 9A:
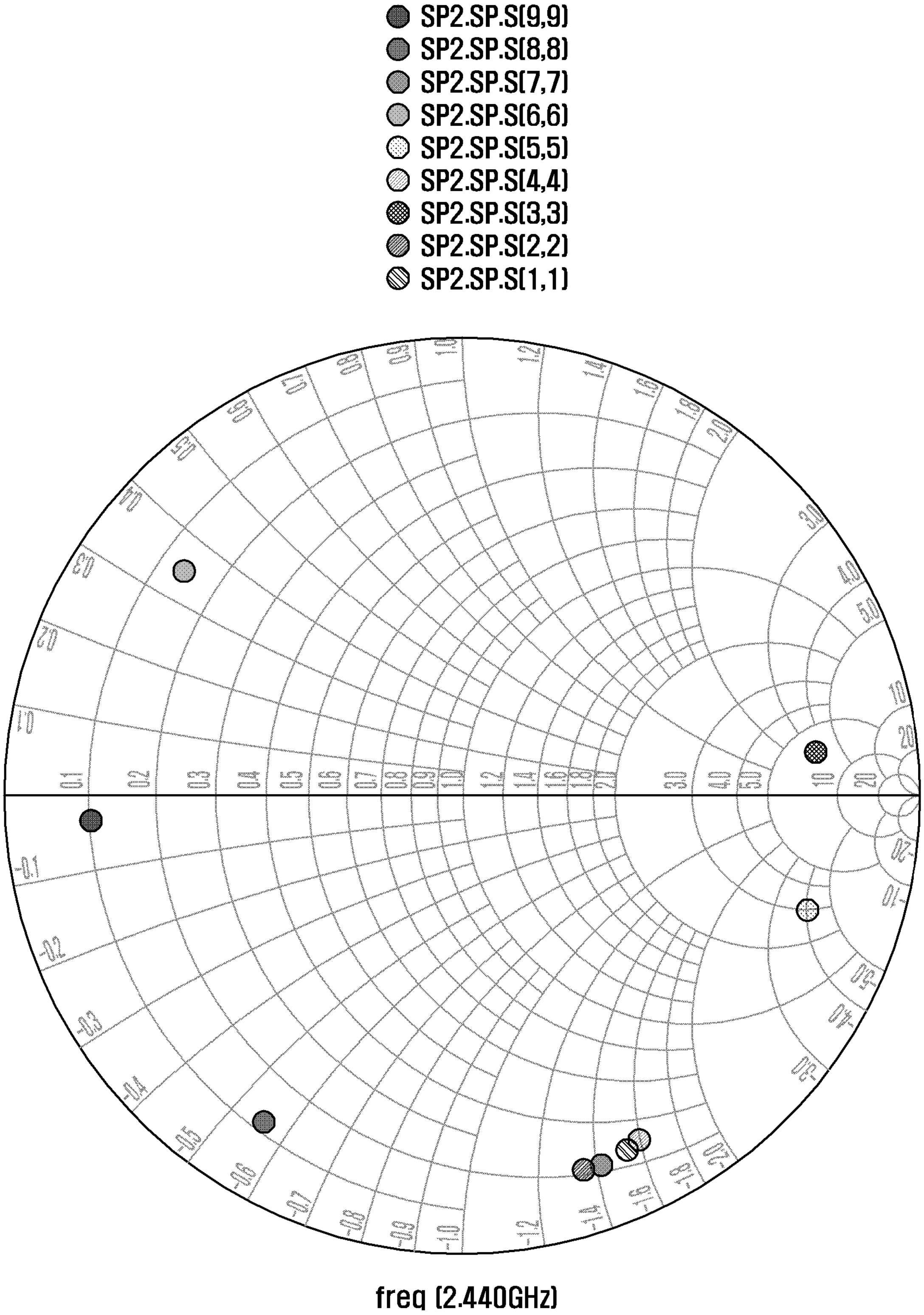
FIG. 9A is a view illustrating a change in impedance of a third antenna including a fourth conductive portion in response to an operating condition of the matching circuit of the foldable electronic device that does not include a first filter circuit, according to an embodiment of the disclosure.
Figure 9B:
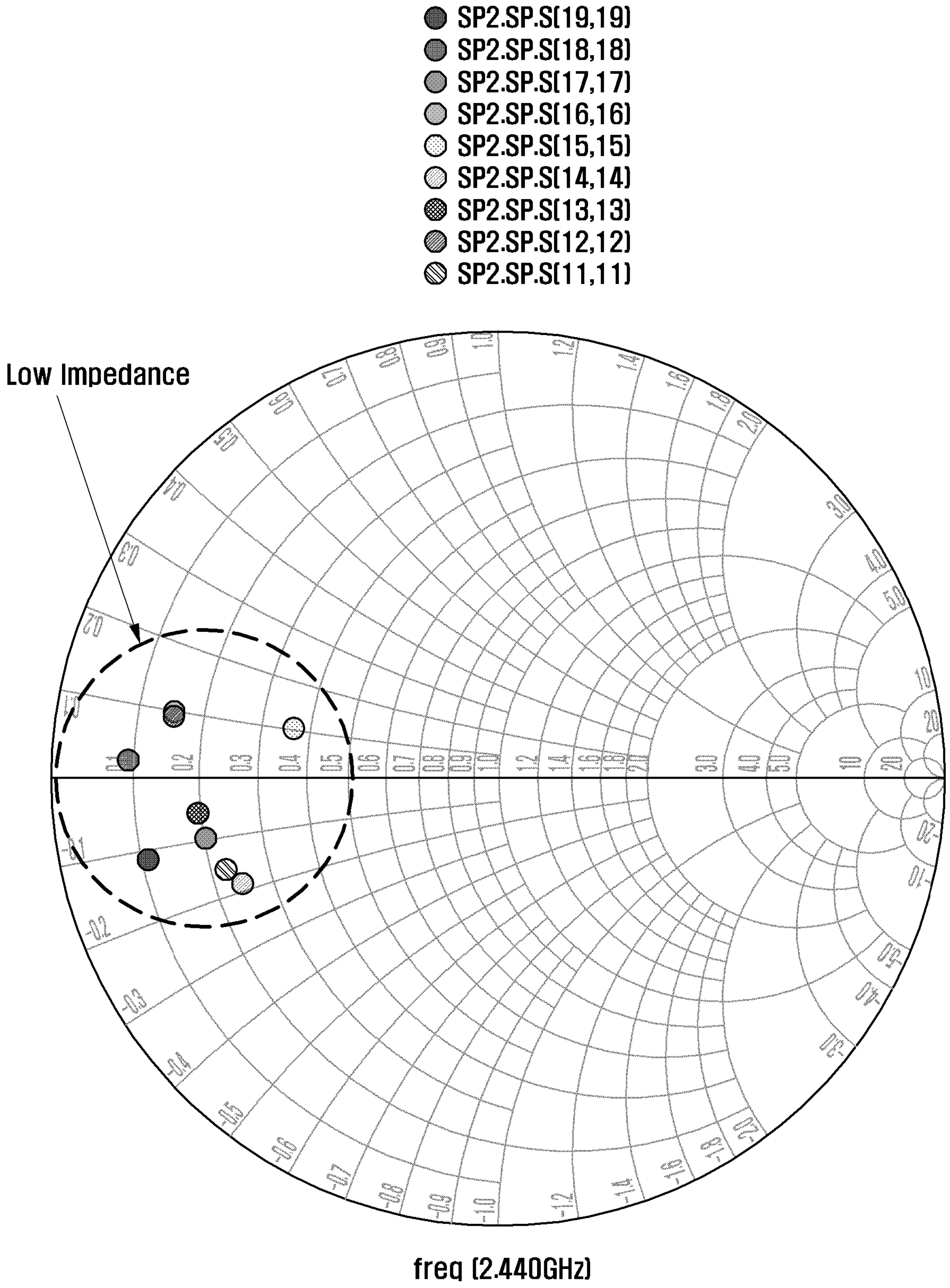
FIG. 9B is a view illustrating a change in impedance of the third antenna including the fourth conductive portion in response to an operating condition of the matching circuit of the foldable electronic device that includes a first filter circuit, according to an embodiment of the disclosure.

FIG. 9A is a view illustrating a change in impedance of the third antenna including the fourth conductive portion in response to an operating condition of the matching circuit of the foldable electronic device that does not include the first filter circuit, according to an embodiment of the disclosure. FIG. 9B is a view illustrating a change in impedance of the third antenna including the fourth conductive portion in response to an operating condition of the matching circuit of the foldable electronic device that includes the first filter circuit, according to an embodiment of the disclosure.

According to an embodiment, when the first housing 210 and the second housing 220 are in the folded state, in case that the second conductive portion 520 of the first housing 210 (e.g., the first antenna A1) and the fourth conductive portion 540 of the second housing 220 (e.g., the third antenna A3) overlap or face each other, the first filter circuit 514 may remove and filter noise transmitted through the first antenna A1 including the second conductive portion 520 to the third antenna A3 including the fourth conductive portion 540 when the matching circuit 512 is operated. According to an embodiment, the foldable electronic device according to the comparative embodiment may not include the first filter circuit 514 according to an embodiment of the disclosure.

When the first housing 210 and the second housing 220 of the foldable electronic device according to the comparative embodiment, which does not include the first filter circuit 514 according to an embodiment of the disclosure, are in the folded state, the first antenna A1 including the second conductive portion 520 of the first housing 210 may be disposed adjacent to the third antenna A3 including the fourth conductive portion 540 of the second housing 220. Referring to FIG. 9A, when the first housing 210 and the second housing 220 of the foldable electronic device is in the folded state, in the foldable electronic device according to the comparative embodiment that does not include the first filter circuit 514, it may be identified that change in the impedance characteristic of the operating frequency of the third antenna A3 including the fourth conductive portion 540 diverges due to the influence of the first antenna A1 including the second conductive portion 520 when the matching circuit 512 is operated. When a characteristic of impedance is changed at an operating frequency of the third antenna A3 including the fourth conductive portion 540, radiation performance of the third antenna A3 including the fourth conductive portion 540 may be degraded or unstable.

According to various embodiments, the foldable electronic device 200 according to an embodiment of the disclosure may have the first filter circuit 514 disposed in the third signal path S3 between the first conductive portion 510 and the matching circuit 512. When the first housing 210 and the second housing 220 are in the folded state, the first filter circuit 514 may filter electrical signals from the first conductive portion 510 in a band substantially equal to the operating frequency of the third antenna A3 including the fourth conductive portion 540.

The foldable electronic device 200, according to an embodiment of the disclosure, may include the first filter circuit 514 in the third signal path S3 between the first conductive portion 510 and the matching circuit 512. According to an embodiment, when the first housing 210 and the second housing 220 are in the folded state, the first antenna A1 including the second conductive portion 520 of the first housing 210 may be disposed adjacent to the third antenna A3 including the fourth conductive portion 540 of the second housing 220. Referring to FIG. 9B, when the matching circuit 512 is operated with the first housing 210 and the second housing 220 in the folded state, the foldable electronic device 200 according to an embodiment of the disclosure utilizes the first filter circuit 514 to filter electrical signals of the first conductive portion 510 and the first antenna A1 including the second conductive portion 520. Therefore, it may be identified that the impedance characteristic converges to lower values or shows a stable change at the operating frequency of the third antenna A3 including the fourth conductive portion 540. When the impedance characteristic converges to lower values at the operating frequency of the third antenna A3 including the fourth conductive portion 540, the third antenna A3 including the fourth conductive portion 540 may maintain stable radiation performance.

Figure 10:
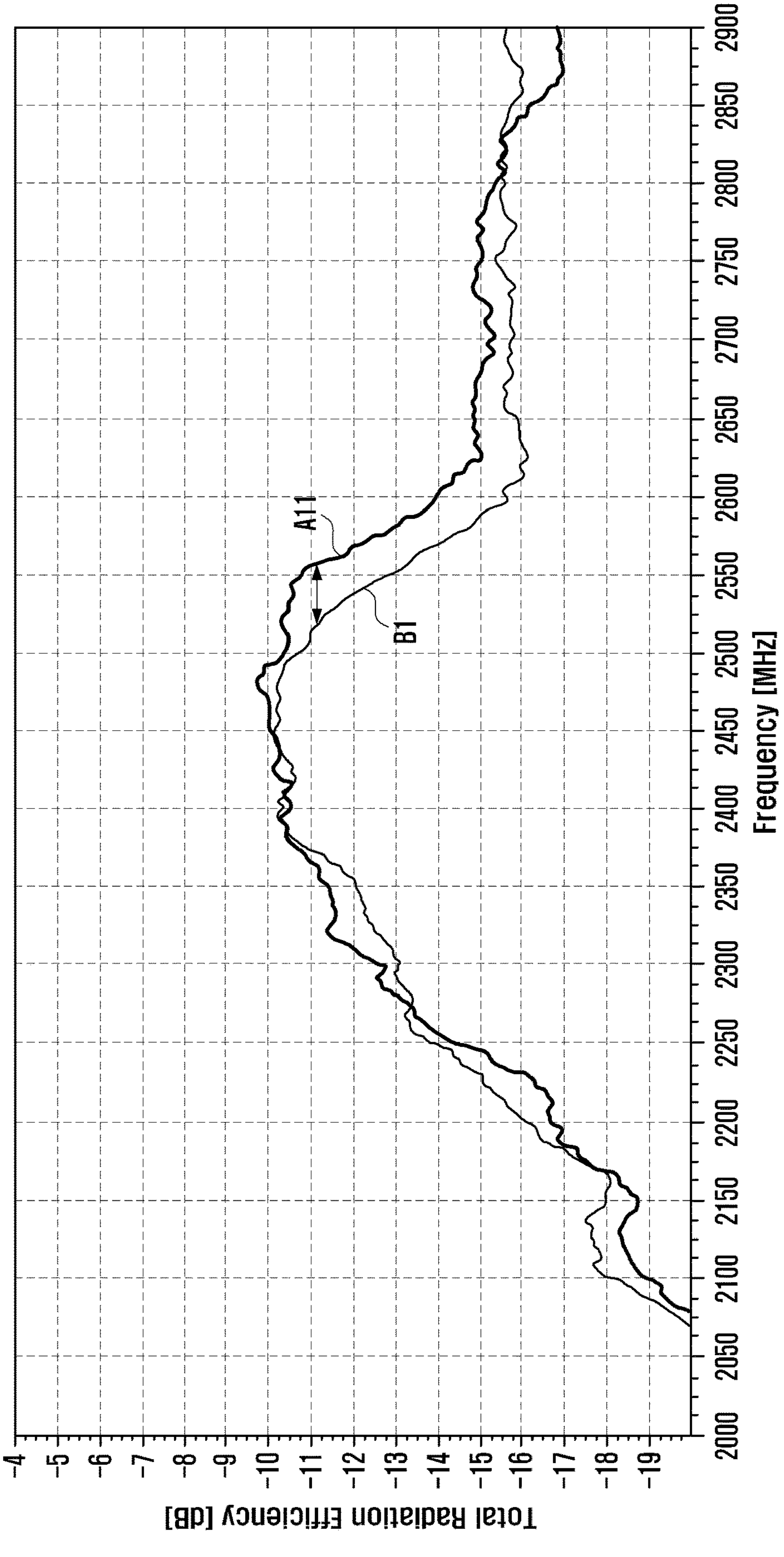
FIG. 10 is a view comparing a bandwidth of a frequency band of the foldable electronic device that does not include a second filter circuit according to the comparative embodiment, and a bandwidth of a frequency band of the foldable electronic device that includes the second filter circuit according to an embodiment of the disclosure.

FIG. 10 is a view comparing a bandwidth of a frequency band of the foldable electronic device that does not include the second filter circuit according to the comparative embodiment, and a bandwidth of a frequency band of the foldable electronic device that includes the second filter circuit according to an embodiment of the disclosure.

According to an embodiment, when the first housing 210 and the second housing 220 are in the folded state, the radiation performance of the first antenna A1 including the second conductive portion 520 may be degraded in case that the first antenna A1 including the second conductive portion 520 of the first housing 210 and the third antenna A3 including the fourth conductive portion 540 of the second housing 220 overlap or face each other.

According to an embodiment, the second filter circuit 544 may be disposed to be electrically connected to the seventh signal path S7 between the second wireless communication module 192*b* and the fourth conductive portion 540 using the eighth signal path S8. The second filter circuit 544 may operate to remove and filter noise transmitted to the first antenna A1 including the second conductive portion 520 via the third antenna A3 including the fourth conductive portion 540, so that the third antenna A3 including the fourth conductive portion 540 does not affect the operating frequency of the first antenna A1 including the second conductive portion 520.

Referring to FIG. 10, it may be identified an improvement of about 40 MHz to 60 MHz in a bandwidth A11 of the first antenna A1 including the second conductive portion 520 after including the second filter circuit 544 according to an embodiment of the disclosure, compared to a bandwidth B1 of the first antenna A1 including the second conductive portion 520 before including the second filter circuit according to the comparative embodiment.

Figure 11:
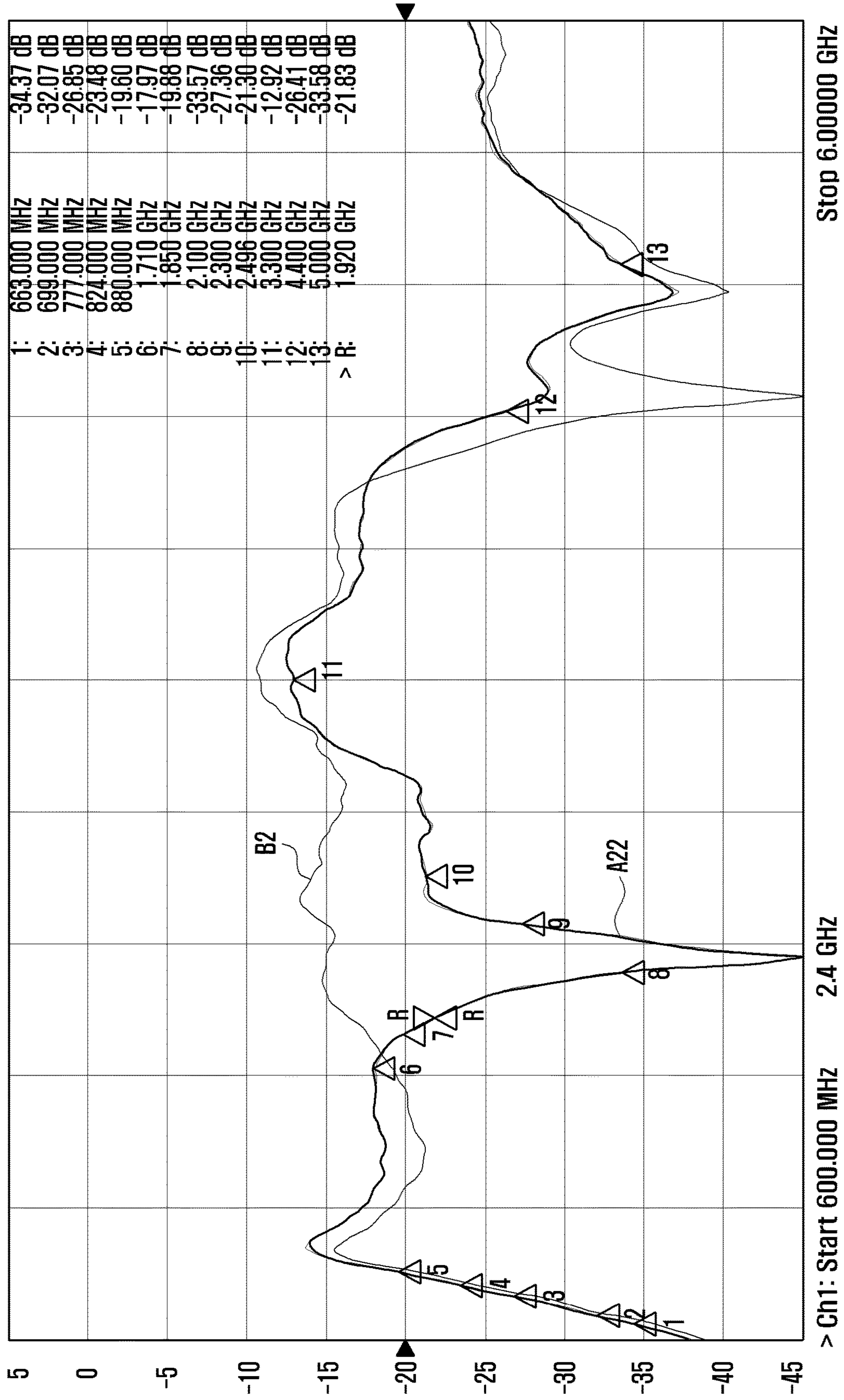
FIG. 11 is a view comparing interference of a second antenna including a third conductive portion and the third antenna including the fourth conductive portion of the foldable electronic device not including the second filter circuit according to the comparative embodiment, and interference of the second antenna including the third conductive portion and the third antenna including the fourth conductive portion of the foldable electronic device including the second filter circuit according to an embodiment of the disclosure.

FIG. 11 is a view comparing interference of the second antenna including the third conductive portion and the third antenna including the fourth conductive portion of the foldable electronic device not including the second filter circuit according to the comparative embodiment, and interference of the second antenna including the third conductive portion and the third antenna including the fourth conductive portion of the foldable electronic device including the second filter circuit according to an embodiment of the disclosure.

Figure 12:
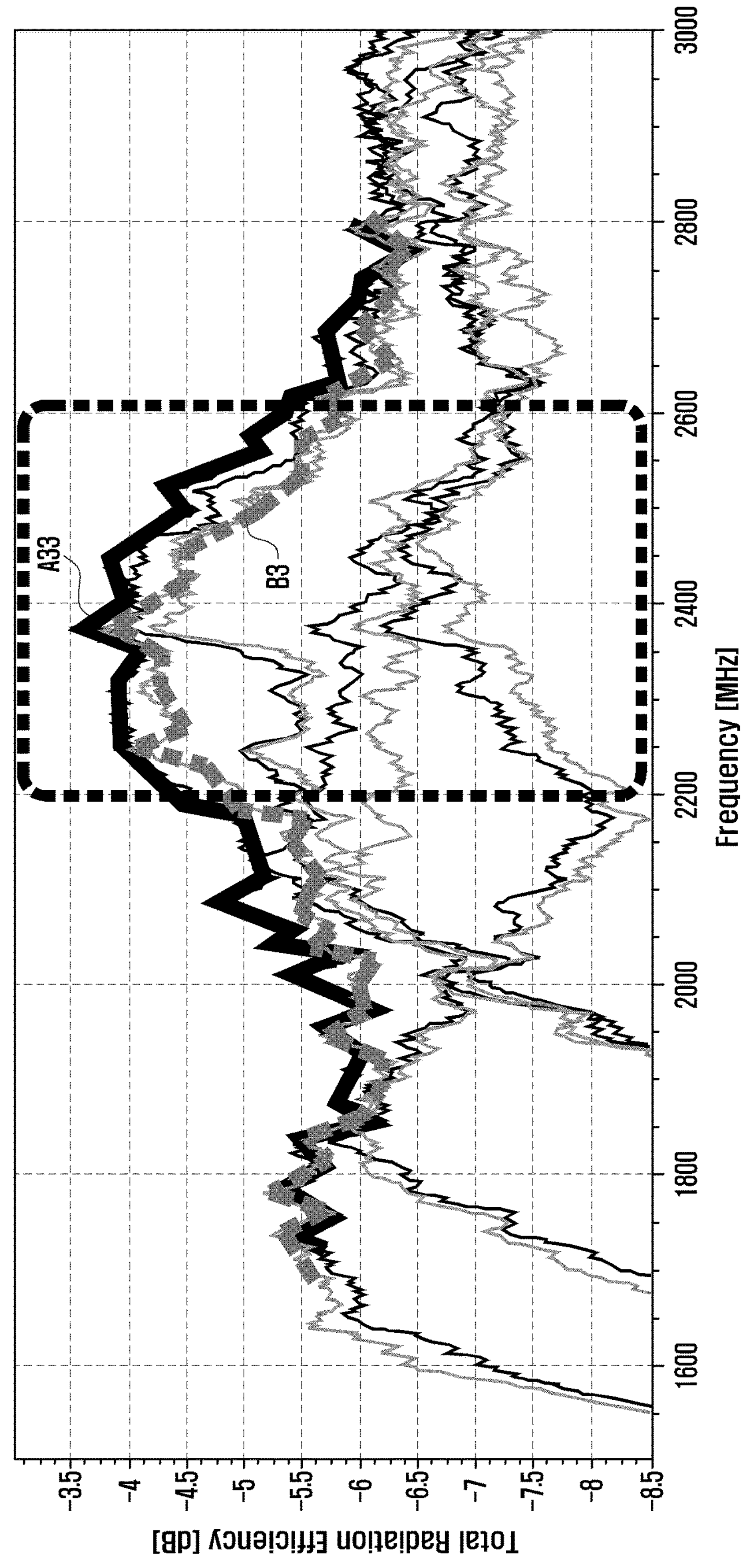
FIG. 12 is a view comparing radiation efficiency of the second antenna including the third conductive portion of the foldable electronic device not including the second filter circuit according to a comparative embodiment, and radiation efficiency of the second antenna including the third conductive portion of the foldable electronic device including the second filter circuit according to an embodiment of the disclosure.

FIG. 12 is a view comparing radiation efficiency of the second antenna including the third conductive portion of the foldable electronic device not including the second filter circuit according to the comparative embodiment, and radiation efficiency of the second antenna including the third conductive portion of the foldable electronic device including the second filter circuit according to an embodiment of the disclosure.

According to an embodiment, the second antenna A2 including the third conductive portion 530 may be disposed adjacent to the third antenna A3 including the fourth conductive portion 540 with the third segmenting portion 503 interposed therebetween. An electrical component of the third antenna A3 including the fourth conductive portion 540 may degrade radiation performance of the second antenna A2 including the third conductive portion 530. The second filter circuit 544 may operate to remove and filter noise of an electrical component transmitted to the second antenna A2 including the third conductive portion 530 via the third antenna A3 including the fourth conductive portion 540, thereby reducing or preventing an influence on the operating frequency of the second antenna A2 including the third conductive portion 530.

Referring to FIG. 11, it may be identified that interference A22 of the second antenna A2 including the third conductive portion 530 and the third antenna A3 including the fourth conductive portion 540 after including the second filter circuit 544 according to an embodiment of the disclosure is reduced in a frequency band of about 2.4 gigahertz (GHz), compared to interference B2 of the second antenna A2 including the third conductive portion 530 and the third antenna A3 including the fourth conductive portion 540 before including the second filter circuit 544 according to the comparative embodiment.

Referring to FIG. 12, it may be identified that radiation efficiency A33 of the second antenna A2 including the third conductive portion 530 after including the second filter circuit 544 according to an embodiment of the disclosure is improved by about 0.3 dB to 1 dB in a frequency band from about 2200 MHz to 2600 MHz, compared to radiation efficiency B3 of the second antenna A2 including the third conductive portion 530 before including the second filter circuit 544 according to the comparative embodiment.

Figure 13:
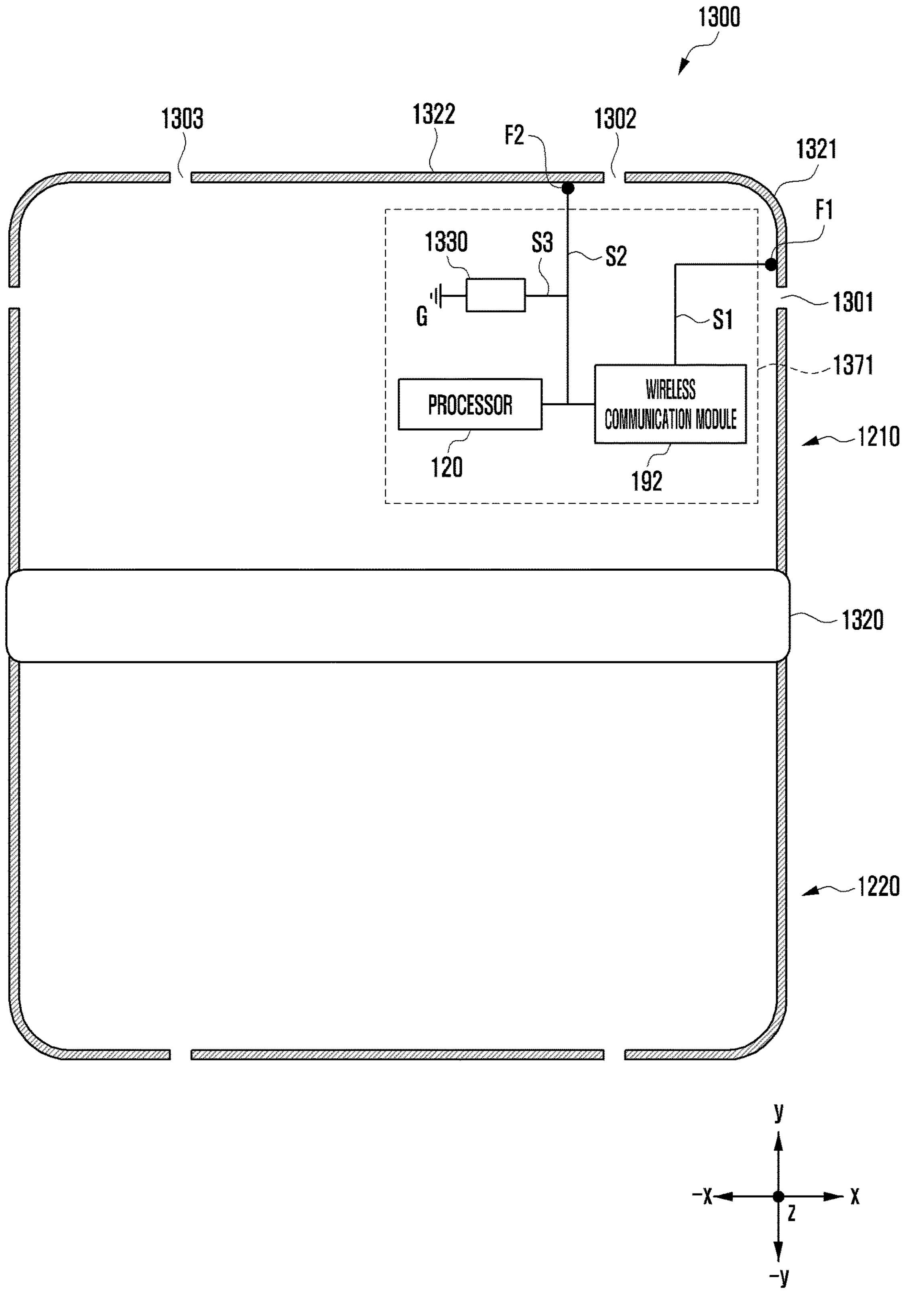
FIG. 13 is a view schematically illustrating a portion of the foldable electronic device including the first housing and the second housing, according to an embodiment of the disclosure.

FIG. 13 is a view schematically illustrating a portion of the foldable electronic device including the first housing and the second housing, according to an embodiment of the disclosure.

According to an embodiment, while the embodiment relating to a foldable electronic device 1300 disclosed in FIG. 13 describes a structure in which the first housing 210 and the second housing 220 are unfolded and folded in a vertical direction (e.g., in the y-axis direction and the −y-axis direction), it may be substantially equally applicable to a foldable electronic device having a structure that is unfolded and folded in a horizontal direction (e.g., in the x-axis direction and the −x-axis direction).

According to various embodiments, the foldable electronic device 1300 disclosed hereinafter may include embodiments of the electronic devices 101 and 200 disclosed in FIGS. 1, 2A, 2B, 3A, 3B, and 4. In the description of the foldable electronic device 1300 disclosed below, constituent elements that are substantially the same as the embodiments disclosed in FIGS. 1, 2A, 2B, 3A, 3B, and 4 may perform substantially the same functions, with only reference numerals being different.

Referring to FIG. 13, the foldable electronic device 1300 according to various embodiments of the disclosure may include a hinge module 1320, a first housing 1210, and a second housing 1220.

According to an embodiment, the first housing 1210 and the second housing 1220 may be operated in an unfolded state or a folded state relative to the hinge module 1320. The hinge module 1320 may rotatably couple the first housing 1210 and the second housing 1220. The first housing 1210 may be at least partially coupled to a first side of the hinge module 1320. The second housing 1220 may be at least partially coupled to a second side of the hinge module 1320.

According to an embodiment, when the foldable electronic device 1300 is in the unfolded state, the first housing 1210 and the second housing 1220 may form an angle of about 180° to be substantially a planar surface. When the foldable electronic device 1300 is in the folded state, the first housing 1210 and the second housing 1220 may be disposed to face each other.

According to an embodiment, the first housing 1210 may include a first segmenting portion 1301, a second segmenting portion 1302, a third segmenting portion 1303, a first conductive portion 1321 (e.g., a first antenna), a second conductive portion 1322 (e.g., a second antenna), and/or a printed circuit board 1371. In an embodiment, the printed circuit board 1371 may include the processor 120, the wireless communication module 192 (e.g., wireless communication circuitry), and/or filter circuit 1330.

According to an embodiment, the first conductive portion 1321 may be disposed between the first segmenting portion 1301 and the second segmenting portion 1302. For example, the first segmenting portion 1301 may be formed closer to the hinge module 1320 than the second segmenting portion 1302. For example, the second conductive portion 1322 may be disposed between the second segmenting portion 1302 and the third segmenting portion 1303.

According to an embodiment, the first conductive portion 1321 is electrically connected to the wireless communication module 192 via the first feed point F1 and the first signal path S1, and may perform the function of the first antenna. The second conductive portion 1322 is electrically connected to the wireless communication module 192 via the second feed point F2 and the second signal path S2, and may perform the function of the second antenna.

According to an embodiment, the processor 120 may be electrically connected to the wireless communication module 192. The processor 120 may control the wireless communication module 192. The processor 120 may include a communications processor and/or a radio frequency IC (RFIC).

According to various embodiments, the processor 120 may control the wireless communication module 192 to transmit a feeding signal to at least one of the first feed point F1 of the first conductive portion 1321 and the second feed point F2 of the second conductive portion 1322. The wireless communication module 192 may support the first conductive portion 1321 and the second conductive portion 1322 to transmit and/or receive wireless signals under the control of the processor 120. The wireless communication module 192 may be electrically connected to the first feed point F1 and the second feed point F2 using, for example, a conductive member (e.g., a contact pad, a coupling member, a C-clip, or a conductive foam spring). The wireless communication module 192 may be disposed at least one or more on the printed circuit board 1371.

According to an embodiment, the filter circuit 1330 may be electrically connected to the second signal path S2 between the wireless communication module 192 and the second conductive portion 1322 using the third signal path S3. The filter circuit 1330 may have a first portion electrically connected to the second signal path S2 via a third signal path S3, and a second portion electrically connected to the ground G. For example, the filter circuit 1330 may include at least one capacitor (e.g., the capacitors 631 and 633 in FIG. 6) and at least one inductor (e.g., the inductor 635 in FIG. 6).

According to various embodiment, the filter circuit 1330 may ensure isolation of the first conductive portion 1321 (e.g., the first antenna) that is adjacent to the second conductive portion 1322 (e.g., the second antenna) with the second segmenting portion 1302 interposed therebetween. The filter circuit 1330 may enable the first conductive portion 1321 (e.g., the first antenna) to operate independently and without the influence of the second conductive portion 1322. The filter circuit 1330 may operate to remove and filter noise (e.g., a parasitic resonance) transmitted to the first conductive portion 1321 through the second conductive portion 1322 so as not to affect the operating frequency of the first conductive portion 1321 (e.g., the first antenna). The filter circuit 1330 may filter frequency components other than the operating frequency of the first conductive portion 1321 (e.g., the first antenna). The filter circuit 1330 may include at least one of a diplexer, a low pass filter (LPF), and a high pass filter (HPF).

Figure 14:
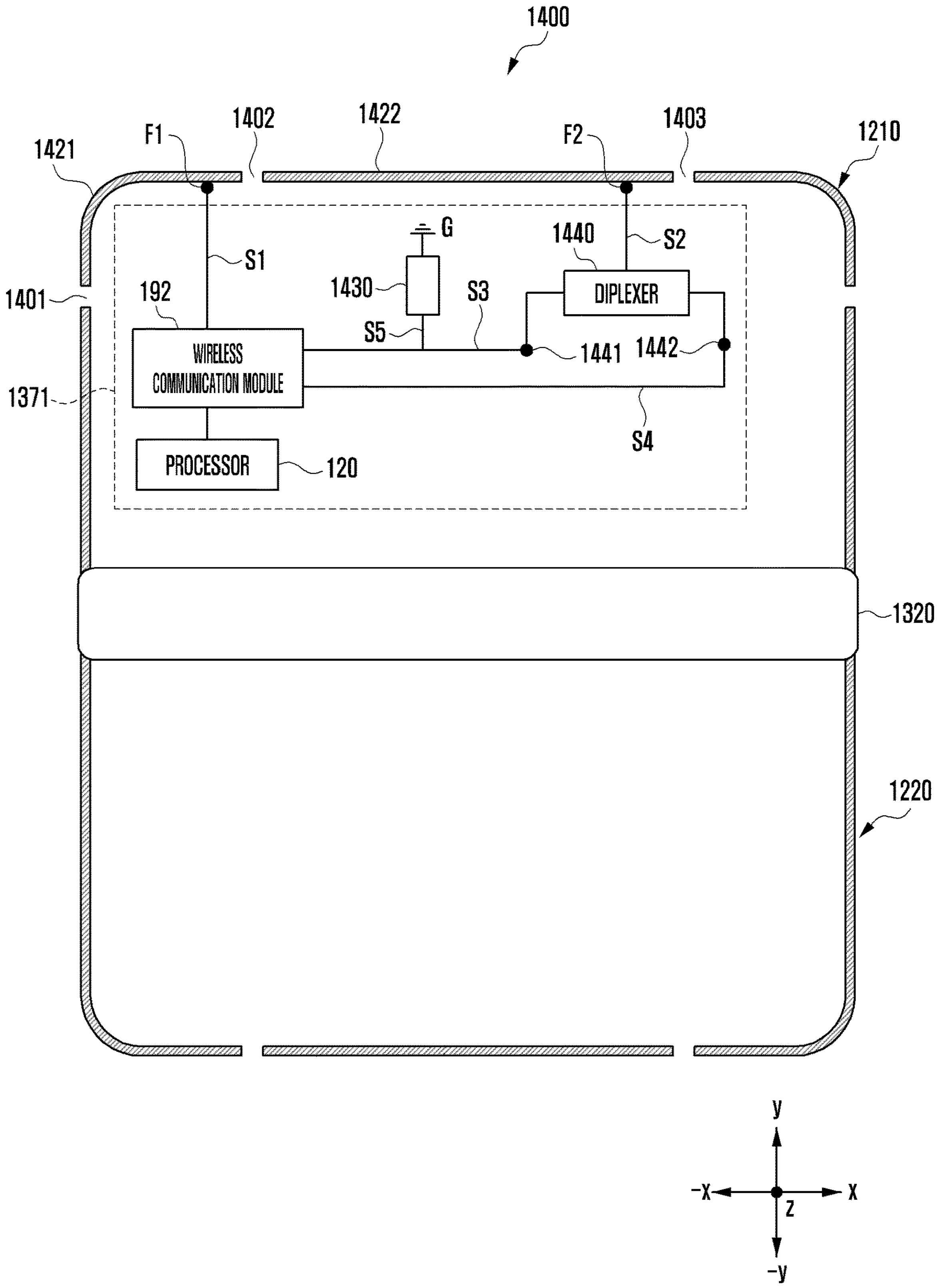
FIG. 14 is a view schematically illustrating a portion of the foldable electronic device in which the first housing includes a filter circuit and a diplexer, according to an embodiment of the disclosure.

FIG. 14 is a view schematically illustrating a portion of the foldable electronic device in which the first housing includes the filter circuit and the diplexer, according to an embodiment of the disclosure.

According to an embodiment, while the embodiment relating to a foldable electronic device 1400 disclosed in FIG. 14 describes a structure in which the first housing 210 and the second housing 220 are unfolded and folded in a vertical direction (e.g., in the y-axis direction and the −y-axis direction), it may be substantially equally applicable to a foldable electronic device having a structure that is unfolded and folded in a horizontal direction (e.g., in the x-axis direction and the −x-axis direction).

According to various embodiments, the foldable electronic device 1400 disclosed hereinafter may include embodiments of the electronic devices 101 and 200 disclosed in FIGS. 1, 2A, 2B, 3A, 3B, and 4. In the description of the foldable electronic device 1400 disclosed below, constituent elements that are substantially the same as the embodiments disclosed in FIGS. 1, 2A, 2B, 3A, 3B, and 4 may perform substantially the same functions, with only reference numerals being different.

Referring to FIG. 14, the foldable electronic device 1400 according to various embodiments of the disclosure may include the hinge module 1320, the first housing 1210, and the second housing 1220.

According to an embodiment, the first housing 1210 and the second housing 1220 may be operated in an unfolded state or a folded state relative to the hinge module 1320. The hinge module 1320 may rotatably couple the first housing 1210 and the second housing 1220. The first housing 1210 may be at least partially coupled to the first side of the hinge module 1320. The second housing 1220 may be at least partially coupled to the second side of the hinge module 1320.

According to an embodiment, when the foldable electronic device 1400 is in the unfolded state, the first housing 1210 and the second housing 1220 may form an angle of about 180° to be substantially a planar surface. When the foldable electronic device 1400 is in the folded state, the first housing 1210 and the second housing 1220 may be disposed to face each other.

According to an embodiment, the first housing 1210 may include a first segmenting portion 1401, a second segmenting portion 1402, a third segmenting portion 1403, a first conductive portion 1421 (e.g., a first antenna), a second conductive portion 1422 (e.g., a second antenna), and/or the printed circuit board 1371. In an embodiment, the printed circuit board 1371 may include the processor 120, the wireless communication module 192 (e.g., wireless communication circuitry), a filter circuit 1430, and/or a diplexer 1440.

According to an embodiment, the first conductive portion 1421 may be disposed between the first segmenting portion 1401 and the second segmenting portion 1402. For example, the first segmenting portion 1401 may be formed closer to the hinge module 1320 than the second segmenting portion 1402. The second conductive portion 1422 may be disposed between the second segmenting portion 1402 and the third segmenting portion 1403.

According to an embodiment, the first conductive portion 1421 is electrically connected to the wireless communication module 192 via the first feed point F1 and the first signal path S1, and may perform the function of the first antenna. The second conductive portion 1422 is electrically connected to the wireless communication module 192 via the second feed point F2, the second signal path S2, the diplexer 1440, the third signal path S3, and/or the fourth signal path S4, and may perform the function of the second antenna.

According to an embodiment, the processor 120 may be electrically connected to the wireless communication module 192. For example, the processor 120 may control the wireless communication module 192 and/or the diplexer 1440. The processor 120 may include, for example, a communications processor and/or a radio frequency IC (RFIC).

According to various embodiments, the processor 120 may control the wireless communication module 192 to transmit a feeding signal to at least one of the first feed point F1 of the first conductive portion 1421 and the second feed point F2 of the second conductive portion 1422. The wireless communication module 192 may support the first conductive portion 1321 and the second conductive portion 1322 to transmit and/or receive wireless signals under the control of the processor 120. The wireless communication module 192 may be electrically connected to the first feed point F1 and the second feed point F2 using, for example, a conductive member (e.g., a contact pad, a coupling member, a C-clip, or a conductive foam spring). For example, the wireless communication module 192 may be disposed at least one or more on the printed circuit board 1371.

According to an embodiment, the diplexer 1440 may be disposed between the wireless communication module 192 and the second conductive portion 1422. The filter circuit 1430 may have a first portion electrically connected to the third signal path S3 using the fifth signal path S5, and a second portion electrically connected to the ground G. The filter circuit 1430 may include at least one capacitor (e.g., the capacitors 631 and 633 in FIG. 6) and at least one inductor (e.g., the inductor 635 in FIG. 6).

According to an embodiment, a first portion of the diplexer 1440 may be electrically connected to the second feed point F2 via the second signal path S2. A second portion 1441 of the diplexer 1440 may be electrically connected to the wireless communication module 192 via the third signal path S3. A third portion 1442 of the diplexer 1440 may be electrically connected to the wireless communication module 192 via the fourth signal path S4. The diplexer 1440 may be a combiner for sharing two different frequency signals. The diplexer 1440 may be, for example, a combiner for radiating communication signals of two different frequency bands without interference, sharing the second conductive portion 1422. The diplexer 1440 may be, for example, a structure that combines a low-pass filter (LPF) and a high-pass filter (HPF). According to various embodiments, the diplexer 1440 may be a branching filter element used to combine or separate/divide two signals of different frequencies on a single channel or line while preventing channel interference.

According to various embodiment, the filter circuit 1330 and the diplexer 1440 may ensure isolation of the first conductive portion 1421 (e.g., the first antenna) that is adjacent to the second conductive portion 1422 with the second segmenting portion 1402 interposed therebetween. The filter circuit 1430 may support the first conductive portion 1421 (e.g., the first antenna) to operate independently and without the influence of the second conductive portion 1422. The first filter circuit 1430 may operate to remove and filter noise (e.g., a parasitic resonance) transmitted to the first conductive portion 1421 through the second conductive portion 1422 so as not to affect the operating frequency of the first conductive portion 1421 (e.g., the first antenna). The filter circuit 1430 may filter frequency components other than the operating frequency of the first conductive portion 1421 (e.g., the first antenna).

The foldable electronic device 200 according to an embodiment of the disclosure may include: a hinge module 320; a first housing 210 coupled at least partially to a first side of the hinge module 320; a first printed circuit board 271 disposed inside the first housing 210 and including a first wireless communication module 192*a*, a processor 120, and at least one of a first ground G1 or a second ground G2; and a second housing 220 coupled at least partially to a second side of the hinge module 320, and configured to be at least one of unfoldable or foldable with the first housing 210 using the hinge module 320. According to an embodiment, the first housing 210 may include: a first segmenting portion 501; a second segmenting portion 502; a first conductive portion 510 disposed between the first segmenting portion 501 and the second segmenting portion 502; and a second conductive portion 520 disposed between the hinge module 320 and the second segmenting portion 502, and electrically connected to the first wireless communication module 192*a*. According to an embodiment, the second housing 220 may include: a second wireless communication module 192*b*; a third segmenting portion 503; a fourth segmenting portion 504; a third conductive portion 530 disposed between the third segmenting portion 503 and the fourth segmenting portion 504, and electrically connected to the second wireless communication module 192*b*; and a fourth conductive portion 540 disposed between the hinge module 320 and the third segmenting portion 503, and electrically connected to the second wireless communication module 192*b*. According to an embodiment, a matching circuit 512 may be disposed between the first conductive portion 510 and the first ground G1. According to an embodiment, a first filter circuit 514 may be connected to a signal path between the first conductive portion 510 and the matching circuit 512.

According to an embodiment, the matching circuit 512 may be electrically connected to the processor 120.

According to an embodiment, the matching circuit 512 may be configured to filter noise transmitted to the third conductive portion 530 through the first conductive portion 510 in response to a control of the processor 120, when the first housing 210 and the second housing 220 are in a folded state, and when the first conductive portion 510 and the third conductive portion 530 overlap.

According to an embodiment, the first filter circuit 514 may have a first portion connected to a signal path between the first conductive portion 510 and the matching circuit 512, and a second portion electrically connected to the second ground G2.

According to an embodiment, the first filter circuit 514 may be configured to filter noise transmitted to the second conductive portion 520 through the first conductive portion 510.

According to an embodiment, the first filter circuit 514 may include at least one of a diplexer, a low pass filter (LPF), and a high pass filter (HPF).

According to an embodiment, the first filter circuit 514 may include a first capacitor 631, a second capacitor 633, and an inductor 635 connected in series.

According to an embodiment, the matching circuit 512 may include at least one of: a switch 610; and a capacitor 605, a first inductor 621, a second inductor 623, or a third inductor 625 electrically connected to the switch 610.

According to an embodiment, the second housing 220 may include a second printed circuit board 272 on which a second filter circuit 544 is disposed, and wherein the second filter circuit 544 is electrically connected to a signal path between the second wireless communication module 192*b* and the fourth conductive portion 540.

According to an embodiment, the second filter circuit 544 may have a first portion connected to a signal path between the second wireless communication module 192*b* and the fourth conductive portion 540, and a second portion electrically connected to a third ground G3.

According to an embodiment, the second filter circuit 544 may be configured to filter noise transmitted to the third conductive portion 530 through the fourth conductive portion 540.

According to an embodiment, the second filter circuit 544 may be configured to filter noise transmitted to the second conductive portion 520 through the fourth conductive portion 540, when the first housing 210 and the second housing 220 are in a folded state, and when the second conductive portion 520 and the fourth conductive portion 540 overlap.

According to an embodiment, the second filter circuit 544 may be composed of a first capacitor 631, a second capacitor 633, and an inductor 635 connected in series.

A foldable electronics device 1300 according to an embodiment may include: a hinge module 1320; a first housing 1210 coupled at least partially to a first side of the hinge module 1320 and including a printed circuit board 1371 on which a wireless communication module 192 and a processor 120 are disposed; and a second housing 1220 coupled at least partially to a second side of the hinge module 1320, and configured to be at least one of unfoldable or foldable with the first housing 1210 using the hinge module 1320. According to an embodiment, the first housing 1210 may include: a first segmenting portion 1301; a second segmenting portion 1302; a third segmenting portion 1303; a first conductive portion 1321 disposed between the first segmenting portion 1301 and the second segmenting portion 1302, and electrically connected to the wireless communication module 192; a second conductive portion 1322 disposed between the second segmenting portion 1302 and the third segmenting portion 1303, and electrically connected to the wireless communication module 192; and a filter circuit 1330 electrically connected to a signal path between the wireless communication module 192 and the second conductive portion 1322.

According to an embodiment, the filter circuit 1330 may have a first portion connected to a signal path between the wireless communication module 192 and the second conductive portion 1322, and a second portion electrically connected to a ground G.

According to an embodiment, the filter circuit 1330 may be configured to filter noise transmitted to the first conductive portion 1321 through the second conductive portion 1322.

According to an embodiment, the filter circuit 1330 may be configured that a first capacitor 631, a second capacitor 633, and an inductor 635 are connected in series.

A foldable electronics device 1400 according to an embodiment may include: a hinge module 1320; a first housing 1210 coupled at least partially to a first side of the hinge module 1320 and including a printed circuit board 1371 on which a wireless communication module 192 and a processor 120 are disposed; and a second housing 1220 coupled at least partially to a second side of the hinge module 1320, and configured to be at least one of unfoldable or foldable with the first housing 1210 using the hinge module 1320. According to an embodiment, the first housing 1210 may include: a first segmenting portion 1401; a second segmenting portion 1402; a third segmenting portion 1403; a first conductive portion 1421 disposed between the first segmenting portion 1401 and the second segmenting portion 1402, and electrically connected to the wireless communication module 192; a second conductive portion 1422 disposed between the second segmenting portion 1402 and the third segmenting portion 1403, and electrically connected to the wireless communication module 192; a diplexer 1440 electrically connected between the wireless communication module 192 and the second conductive portion 1422; and a filter circuit 1430 electrically connected to a signal path between the wireless communication module 192 and the second conductive portion 1422.

According to an embodiment, the filter circuit 1430 may have a first portion connected to a signal path between the wireless communication module 192 and the second conductive portion 1422, and a second portion electrically connected to a ground G.

According to an embodiment, the filter circuit 1430 may be configured to filter noise transmitted to the first conductive portion 1421 through the second conductive portion 1422.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:

a hinge module;

a first housing coupled at least partially to a first side of the hinge module;

a first printed circuit board disposed inside the first housing and including a wireless communication module, a processor, and at least one of a first ground or a second ground; and a second housing coupled at least partially to a second side of the hinge module, and configured to be at least one of unfoldable or foldable with the first housing using the hinge module, wherein the first housing includes:

a first segmenting portion, a second segmenting portion, a first conductive portion disposed between the first segmenting portion and the second segmenting portion, and a second conductive portion disposed between the hinge module and the second segmenting portion, and electrically connected to the wireless communication module, wherein the second housing includes:

a third segmenting portion, a fourth segmenting portion, a third conductive portion disposed between the third segmenting portion and the fourth segmenting portion, and electrically connected to the wireless communication module, and a fourth conductive portion disposed between the hinge module and the third segmenting portion, and electrically connected to the wireless communication module, and wherein a matching circuit is disposed between the first conductive portion and the first ground, and a first filter circuit is connected to a signal path between the first conductive portion and the matching circuit.

2. The foldable electronic device of claim 1, wherein the matching circuit is electrically connected to the processor.

3. The foldable electronic device of claim 1, wherein the matching circuit is configured to filter noise transmitted to the third conductive portion through the first conductive portion in response to a control of the processor, when the first housing and the second housing are in a folded state, and when the first conductive portion and the third conductive portion overlap.

4. The foldable electronic device of claim 1, wherein the first filter circuit includes:

a first portion connected to the signal path between the first conductive portion and the matching circuit, and a second portion electrically connected to the second ground.

5. The foldable electronic device of claim 1, wherein the first filter circuit is configured to filter noise transmitted to the second conductive portion through the first conductive portion.

6. The foldable electronic device of claim 1, wherein the first filter circuit includes at least one of a diplexer, a low pass filter (LPF), or a high pass filter (HPF).

7. The foldable electronic device of claim 1, wherein the first filter circuit includes a first capacitor, a second capacitor, and an inductor connected in series.

8. The foldable electronic device of claim 1, wherein the matching circuit includes at least one of:

a switch, a capacitor, a first inductor, a second inductor, or a third inductor electrically connected to the switch.

9. The foldable electronic device of claim 1, wherein the second housing includes a second printed circuit board on which a second filter circuit is disposed, and wherein the second filter circuit is electrically connected to the signal path between the wireless communication module and the fourth conductive portion.

10. The foldable electronic device of claim 9, wherein the second filter circuit includes:

a first portion connected to the signal path between the wireless communication module and the fourth conductive portion, and a second portion electrically connected to a third ground.

11. The foldable electronic device of claim 9, wherein the second filter circuit is configured to filter noise transmitted to the third conductive portion through the fourth conductive portion.

12. The foldable electronic device of claim 9, wherein the second filter circuit is configured to filter noise transmitted to the second conductive portion through the fourth conductive portion, when the first housing and the second housing are in a folded state, and when the second conductive portion and the fourth conductive portion overlap.

13. The foldable electronic device of claim 9, wherein the second filter circuit includes a first capacitor, a second capacitor, and an inductor connected in series.

14. A foldable electronic device comprising:

a hinge module;

a first housing coupled at least partially to a first side of the hinge module and including a printed circuit board on which a wireless communication module and a processor are disposed; and a second housing coupled at least partially to a second side of the hinge module, and configured to be at least one of unfoldable or foldable with the first housing using the hinge module, wherein the first housing includes:

a first segmenting portion, a second segmenting portion, a third segmenting portion, a first conductive portion disposed between the first segmenting portion and the second segmenting portion, and electrically connected to the wireless communication module, a second conductive portion disposed between the second segmenting portion and the third segmenting portion, and electrically connected to the wireless communication module, and a filter circuit electrically connected to a signal path between the wireless communication module and the second conductive portion.

15. The foldable electronic device of claim 14, wherein the filter circuit includes:

a first portion connected to the signal path between the wireless communication module and the second conductive portion, and a second portion electrically connected to a ground.

16. The foldable electronic device of claim 14, wherein the filter circuit is configured to filter noise transmitted to the first conductive portion through the second conductive portion.

17. The foldable electronic device of claim 14, wherein the filter circuit includes a first capacitor, a second capacitor, and an inductor connected in series.

18. A foldable electronic device comprising:

a hinge module;

a first housing coupled at least partially to a first side of the hinge module and including a printed circuit board on which a wireless communication module and a processor are disposed; and a second housing coupled at least partially to a second side of the hinge module, and configured to be at least one of unfoldable or foldable with the first housing using the hinge module, wherein the first housing includes:

a first segmenting portion, a second segmenting portion, a third segmenting portion, a first conductive portion disposed between the first segmenting portion and the second segmenting portion, and electrically connected to the wireless communication module, a second conductive portion disposed between the second segmenting portion and the third segmenting portion, and electrically connected to the wireless communication module, a diplexer electrically connected between the wireless communication module and the second conductive portion, and a filter circuit electrically connected to a signal path between the wireless communication module and the second conductive portion.

19. The foldable electronic device of claim 18, wherein the filter circuit includes:

a first portion connected to the signal path between the wireless communication module and the second conductive portion, and a second portion electrically connected to a ground.

20. The foldable electronic device of claim 18, wherein the filter circuit is configured to filter noise transmitted to the first conductive portion through the second conductive portion.

* * * * *